US012664281B2

(12) United States Patent
Huntley

(10) Patent No.: US 12,664,281 B2
(45) Date of Patent: Jun. 23, 2026

(54) METHODS AND APPARATUSES FOR INSTRUCTIONS FOR A TRUST DOMAIN IMPLEMENTED BY A PROCESSOR

(71) Applicant: Intel Corporation, Santa Clara, CA (US)

(72) Inventor: Barry E. Huntley, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/148,420

(22) Filed: Dec. 29, 2022

(65) Prior Publication Data

US 2024/0220621 A1     Jul. 4, 2024

(51) Int. Cl.
*G06F 21/57* (2013.01)

(52) U.S. Cl.
CPC ........ *G06F 21/57* (2013.01); *G06F 2221/034* (2013.01)

(58) Field of Classification Search
CPC ..... G06F 21/57; G06F 2221/034; G06F 21/53
See application file for complete search history.

(56) References Cited

U.S. PATENT DOCUMENTS

| | | | | |
|---|---|---|---|---|
| 11,102,002 B2 * | 8/2021 | Mathane | .................... | H04L 9/14 |
| 2019/0087575 A1 * | 3/2019 | Sahita | ..................... | G06F 21/57 |
| 2019/0311123 A1 * | 10/2019 | Lal | ........................ | H04L 9/0891 |
| 2020/0145419 A1 * | 5/2020 | Yitbarek | ............. | H04L 63/0853 |
| 2020/0213115 A1 * | 7/2020 | Mathane | ................ | G06F 21/575 |
| 2020/0310972 A1 * | 10/2020 | Shanbhogue | ........... | G06F 21/79 |
| 2021/0200879 A1 * | 7/2021 | Gerzon | ................ | G06F 9/45558 |

FOREIGN PATENT DOCUMENTS

WO          2024/000565 A1      1/2024

OTHER PUBLICATIONS

Advanced Micro Devices, Inc., "AMD64 Technology—AMD64 Architecture Programmer's Manual—vol. 2: System Programming", Publication No. 24593, Rev. 3.39, Oct. 2022, 806 pages.
Intel Corporation, "Intel® 64 and IA-32 Architectures Software Developer's Manual," Combined vols. 1, 2A, 2B, 2C, 2D, 3A, 3B, 3C, 3D and 4, Dec. 2022, 5060 pages.

* cited by examiner

*Primary Examiner* — J. Brant Murphy
(74) *Attorney, Agent, or Firm* — NICHOLSON DE VOS WEBSTER & ELLIOTT LLP

(57)                ABSTRACT

Techniques for implementing instructions for a trust domain implemented by a processor are described. In certain examples, a hardware processor core, that implements a trust domain manager to manage one or more hardware isolated virtual machines as a respective trust domain with a region of protected memory, includes a debug register; a control register; decoder circuitry to decode a first single instruction into a first decoded instruction, the first single instruction having a field to indicate a data structure to store a control state of a trust domain and a debug state of the trust domain, and an opcode to indicate execution circuitry is to load the control state of the trust domain from the data structure into the control register and load the debug state of the trust domain from the data structure into the debug register; and the execution circuitry to execute the first decoded instruction according to the opcode.

24 Claims, 22 Drawing Sheets

TRUST DOMAIN STATE
126

| Name | Offset (Bytes) | Reset Value |
|---|---|---|
| DEBUG REGISTER-0 (DR0) | 0 | 0 |
| DEBUG REGISTER-1 (DR1) | 8 | 0 |
| DEBUG REGISTER-2 (DR2) | 16 | 0 |
| DEBUG REGISTER-3 (DR3) | 24 | 0 |
| [1]DEBUG REGISTER-6 (DR6) | 32 | 0xFFFF0FF0 |
| LINEAR ADDRESS CAUSING A PAGE FAULT (e.g., CR2) | 40 | 0 |
| [2]IA32_DS_AREA MSR | 48 | 0 |
| [2]IA32_STAR MSR | 56 | 0 |
| [2]IA32_LSTAR MSR | 64 | 0 |
| [2]IA32_KERNEL_GSBASE MSR | 72 | 0 |
| [3]IA32_TSC_AUX MSR | 80 | 0 |
| [3]IA32_FMASK MSR | 88 | 0 |

FIG. 3

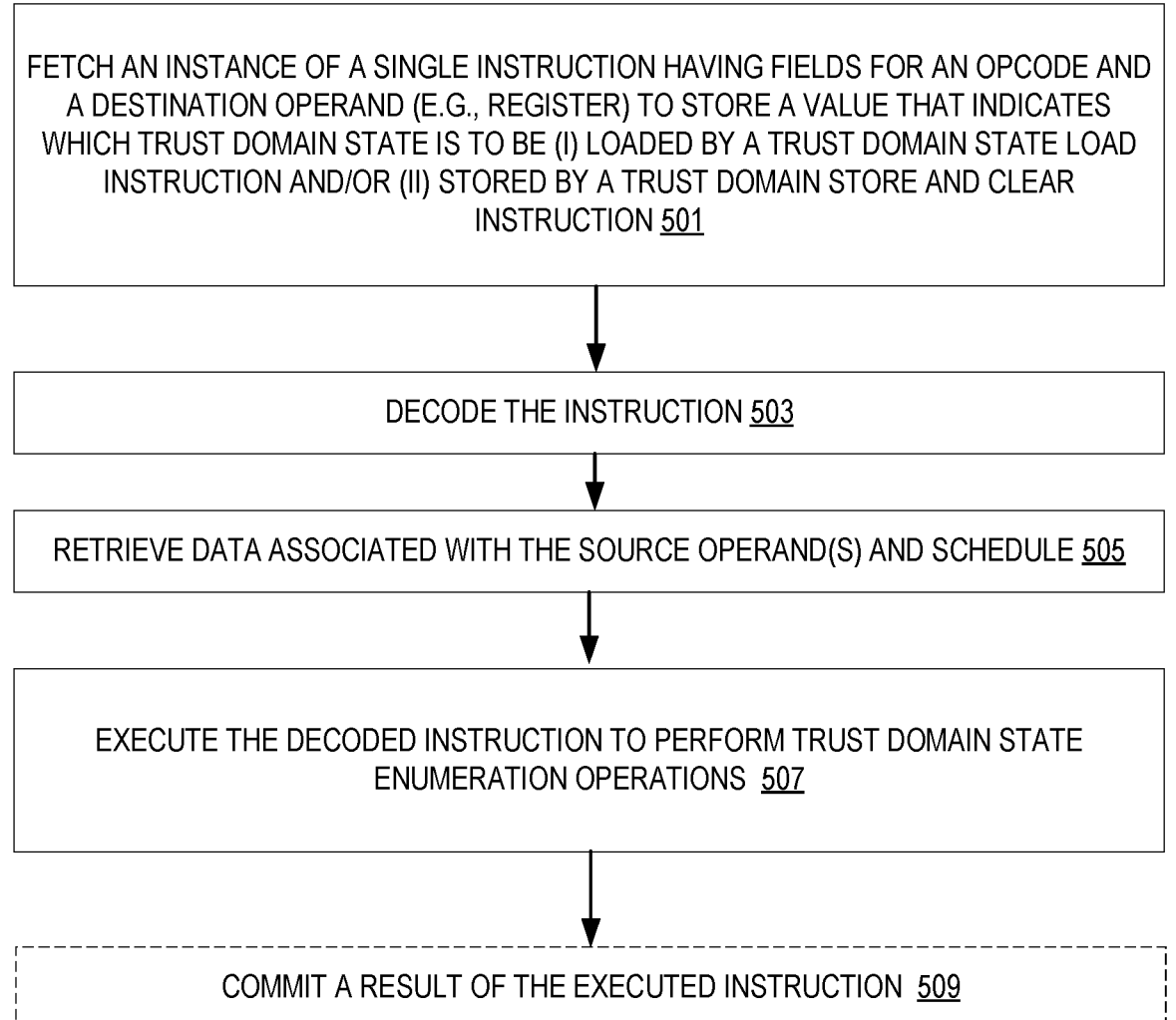

FETCH AN INSTANCE OF A SINGLE INSTRUCTION HAVING FIELDS FOR AN OPCODE AND A DESTINATION OPERAND (E.G., REGISTER) TO STORE A VALUE THAT INDICATES WHICH TRUST DOMAIN STATE IS TO BE (I) LOADED BY A TRUST DOMAIN STATE LOAD INSTRUCTION AND/OR (II) STORED BY A TRUST DOMAIN STORE AND CLEAR INSTRUCTION 501

DECODE THE INSTRUCTION 503

RETRIEVE DATA ASSOCIATED WITH THE SOURCE OPERAND(S) AND SCHEDULE 505

EXECUTE THE DECODED INSTRUCTION TO PERFORM TRUST DOMAIN STATE ENUMERATION OPERATIONS 507

COMMIT A RESULT OF THE EXECUTED INSTRUCTION 509

FIG. 5

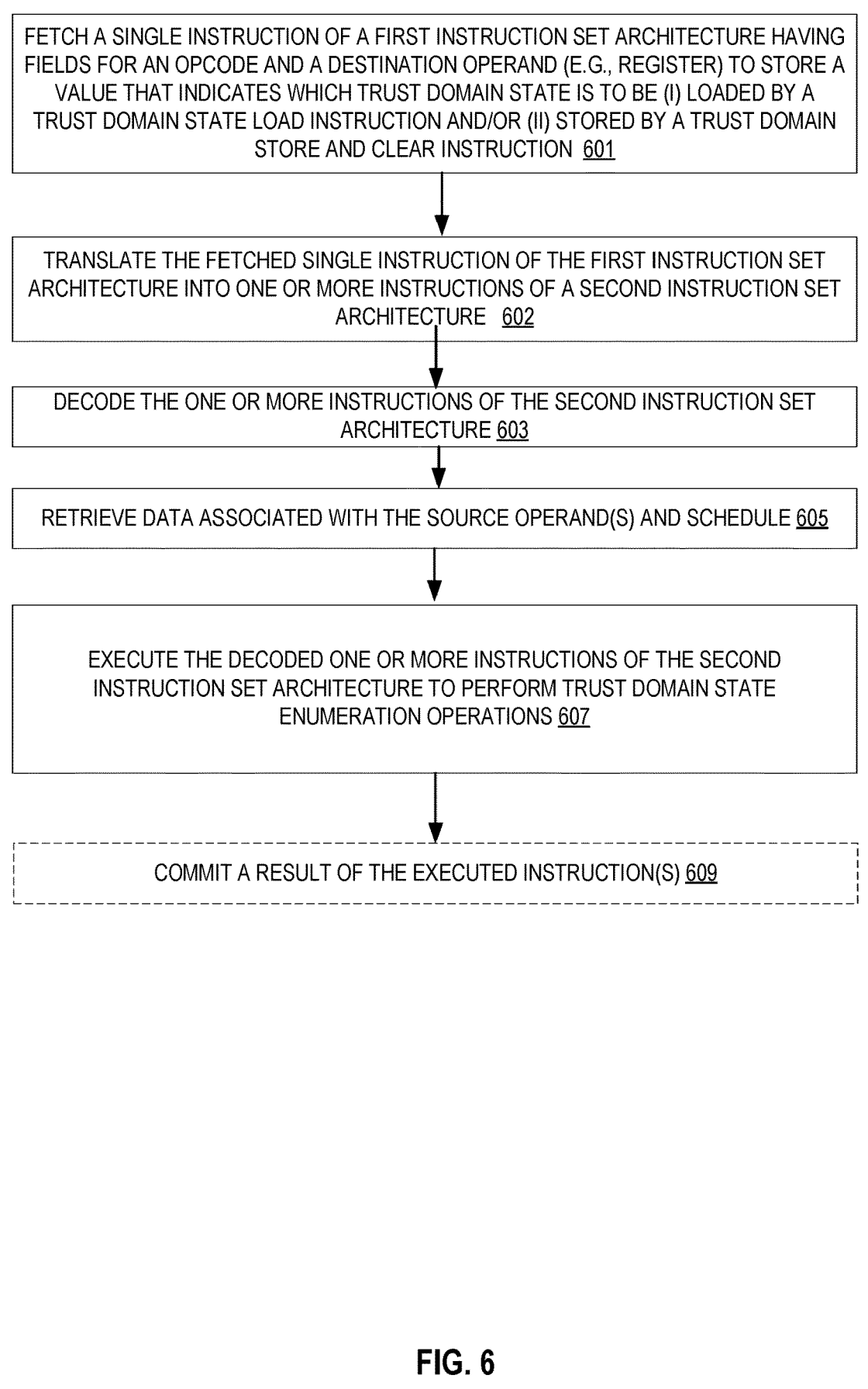

FETCH A SINGLE INSTRUCTION OF A FIRST INSTRUCTION SET ARCHITECTURE HAVING FIELDS FOR AN OPCODE AND A DESTINATION OPERAND (E.G., REGISTER) TO STORE A VALUE THAT INDICATES WHICH TRUST DOMAIN STATE IS TO BE (I) LOADED BY A TRUST DOMAIN STATE LOAD INSTRUCTION AND/OR (II) STORED BY A TRUST DOMAIN STORE AND CLEAR INSTRUCTION 601

TRANSLATE THE FETCHED SINGLE INSTRUCTION OF THE FIRST INSTRUCTION SET ARCHITECTURE INTO ONE OR MORE INSTRUCTIONS OF A SECOND INSTRUCTION SET ARCHITECTURE 602

DECODE THE ONE OR MORE INSTRUCTIONS OF THE SECOND INSTRUCTION SET ARCHITECTURE 603

RETRIEVE DATA ASSOCIATED WITH THE SOURCE OPERAND(S) AND SCHEDULE 605

EXECUTE THE DECODED ONE OR MORE INSTRUCTIONS OF THE SECOND INSTRUCTION SET ARCHITECTURE TO PERFORM TRUST DOMAIN STATE ENUMERATION OPERATIONS 607

COMMIT A RESULT OF THE EXECUTED INSTRUCTION(S) 609

FIG. 6

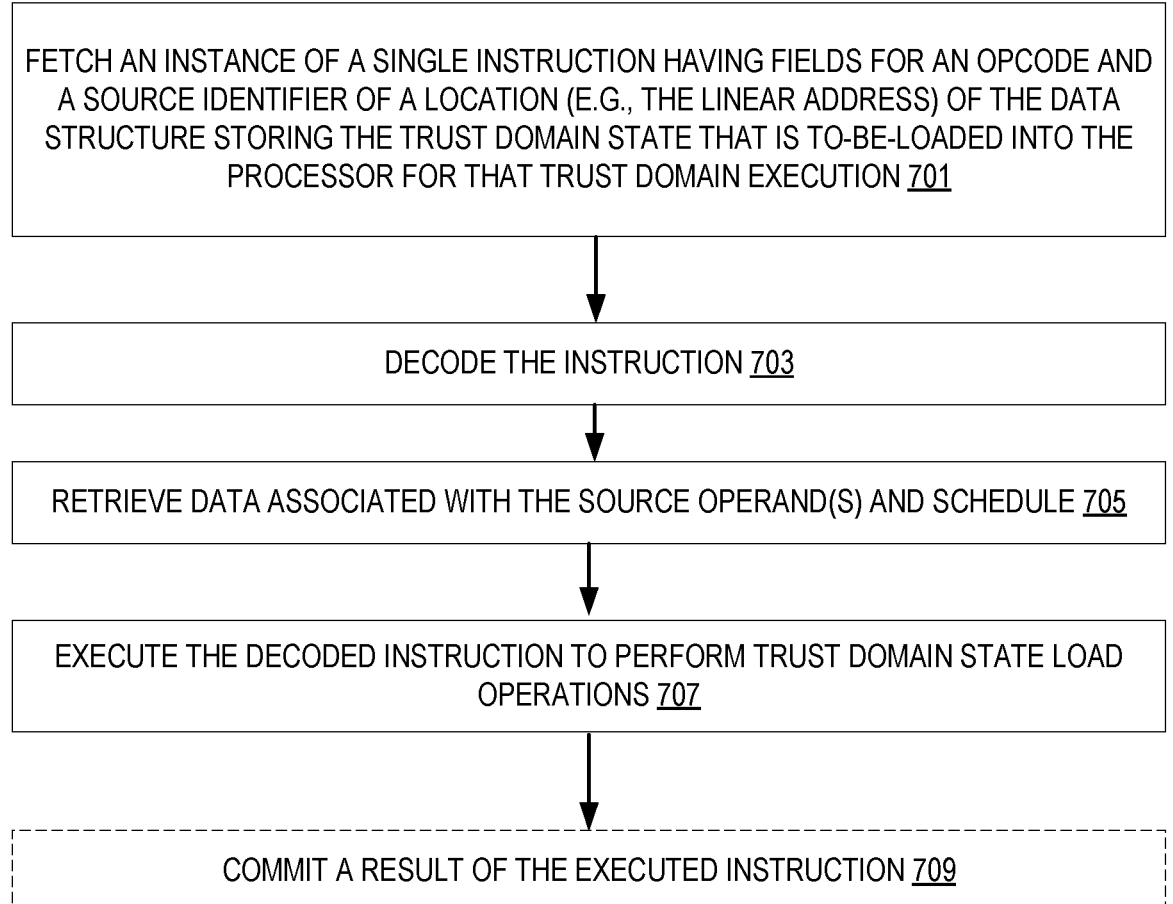

FETCH AN INSTANCE OF A SINGLE INSTRUCTION HAVING FIELDS FOR AN OPCODE AND A SOURCE IDENTIFIER OF A LOCATION (E.G., THE LINEAR ADDRESS) OF THE DATA STRUCTURE STORING THE TRUST DOMAIN STATE THAT IS TO-BE-LOADED INTO THE PROCESSOR FOR THAT TRUST DOMAIN EXECUTION 701

DECODE THE INSTRUCTION 703

RETRIEVE DATA ASSOCIATED WITH THE SOURCE OPERAND(S) AND SCHEDULE 705

EXECUTE THE DECODED INSTRUCTION TO PERFORM TRUST DOMAIN STATE LOAD OPERATIONS 707

COMMIT A RESULT OF THE EXECUTED INSTRUCTION 709

FIG. 7

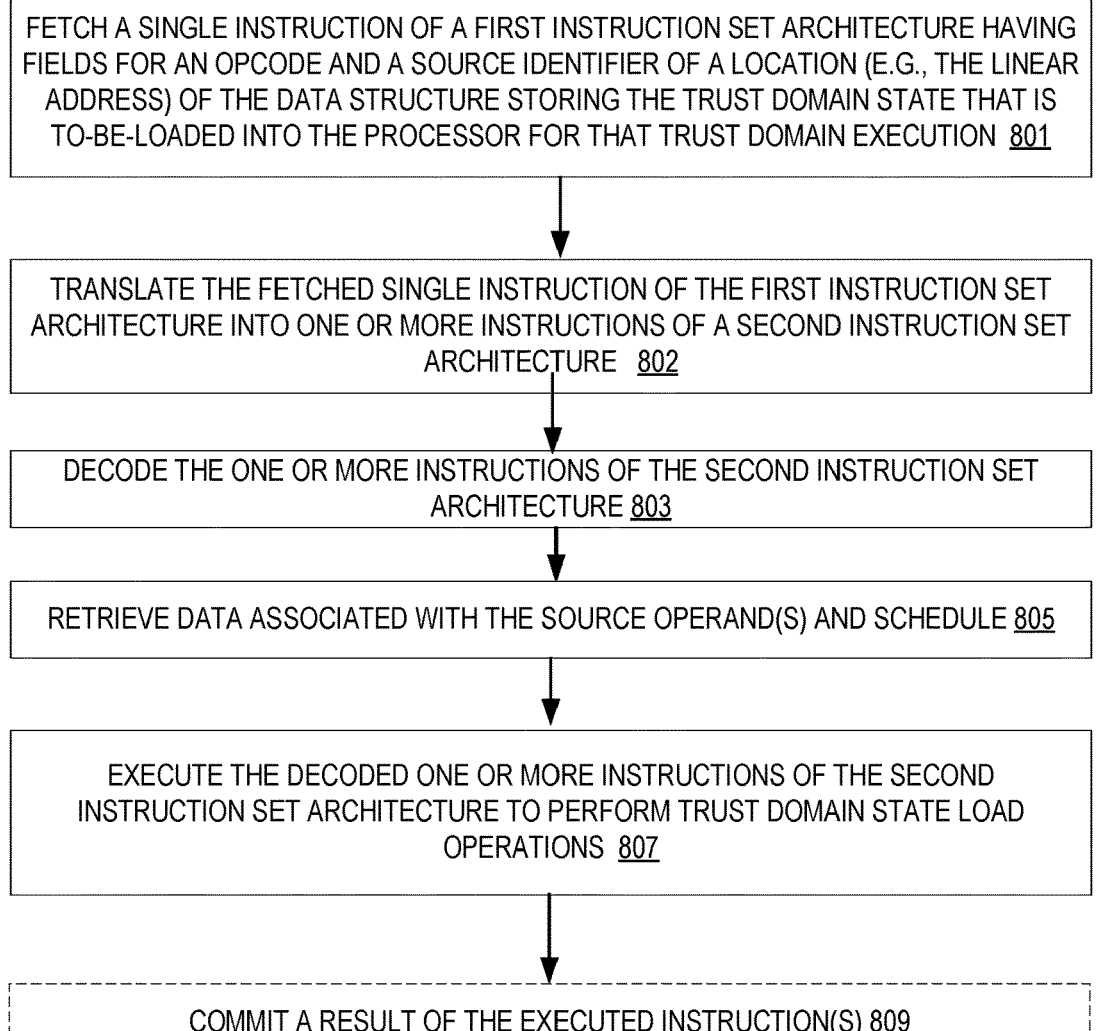

FETCH A SINGLE INSTRUCTION OF A FIRST INSTRUCTION SET ARCHITECTURE HAVING FIELDS FOR AN OPCODE AND A SOURCE IDENTIFIER OF A LOCATION (E.G., THE LINEAR ADDRESS) OF THE DATA STRUCTURE STORING THE TRUST DOMAIN STATE THAT IS TO-BE-LOADED INTO THE PROCESSOR FOR THAT TRUST DOMAIN EXECUTION 801

TRANSLATE THE FETCHED SINGLE INSTRUCTION OF THE FIRST INSTRUCTION SET ARCHITECTURE INTO ONE OR MORE INSTRUCTIONS OF A SECOND INSTRUCTION SET ARCHITECTURE 802

DECODE THE ONE OR MORE INSTRUCTIONS OF THE SECOND INSTRUCTION SET ARCHITECTURE 803

RETRIEVE DATA ASSOCIATED WITH THE SOURCE OPERAND(S) AND SCHEDULE 805

EXECUTE THE DECODED ONE OR MORE INSTRUCTIONS OF THE SECOND INSTRUCTION SET ARCHITECTURE TO PERFORM TRUST DOMAIN STATE LOAD OPERATIONS 807

COMMIT A RESULT OF THE EXECUTED INSTRUCTION(S) 809

FIG. 8

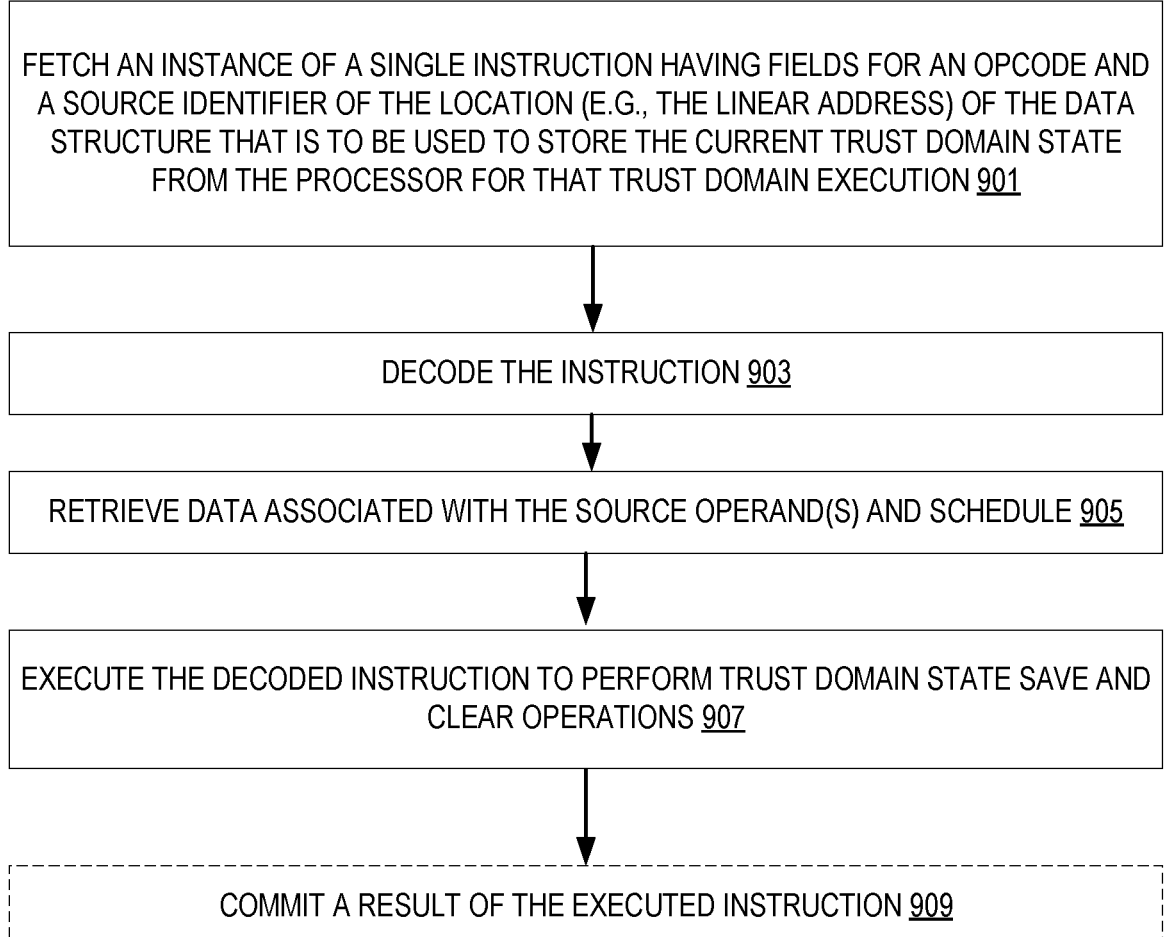

FETCH AN INSTANCE OF A SINGLE INSTRUCTION HAVING FIELDS FOR AN OPCODE AND A SOURCE IDENTIFIER OF THE LOCATION (E.G., THE LINEAR ADDRESS) OF THE DATA STRUCTURE THAT IS TO BE USED TO STORE THE CURRENT TRUST DOMAIN STATE FROM THE PROCESSOR FOR THAT TRUST DOMAIN EXECUTION 901

DECODE THE INSTRUCTION 903

RETRIEVE DATA ASSOCIATED WITH THE SOURCE OPERAND(S) AND SCHEDULE 905

EXECUTE THE DECODED INSTRUCTION TO PERFORM TRUST DOMAIN STATE SAVE AND CLEAR OPERATIONS 907

COMMIT A RESULT OF THE EXECUTED INSTRUCTION 909

FIG. 9

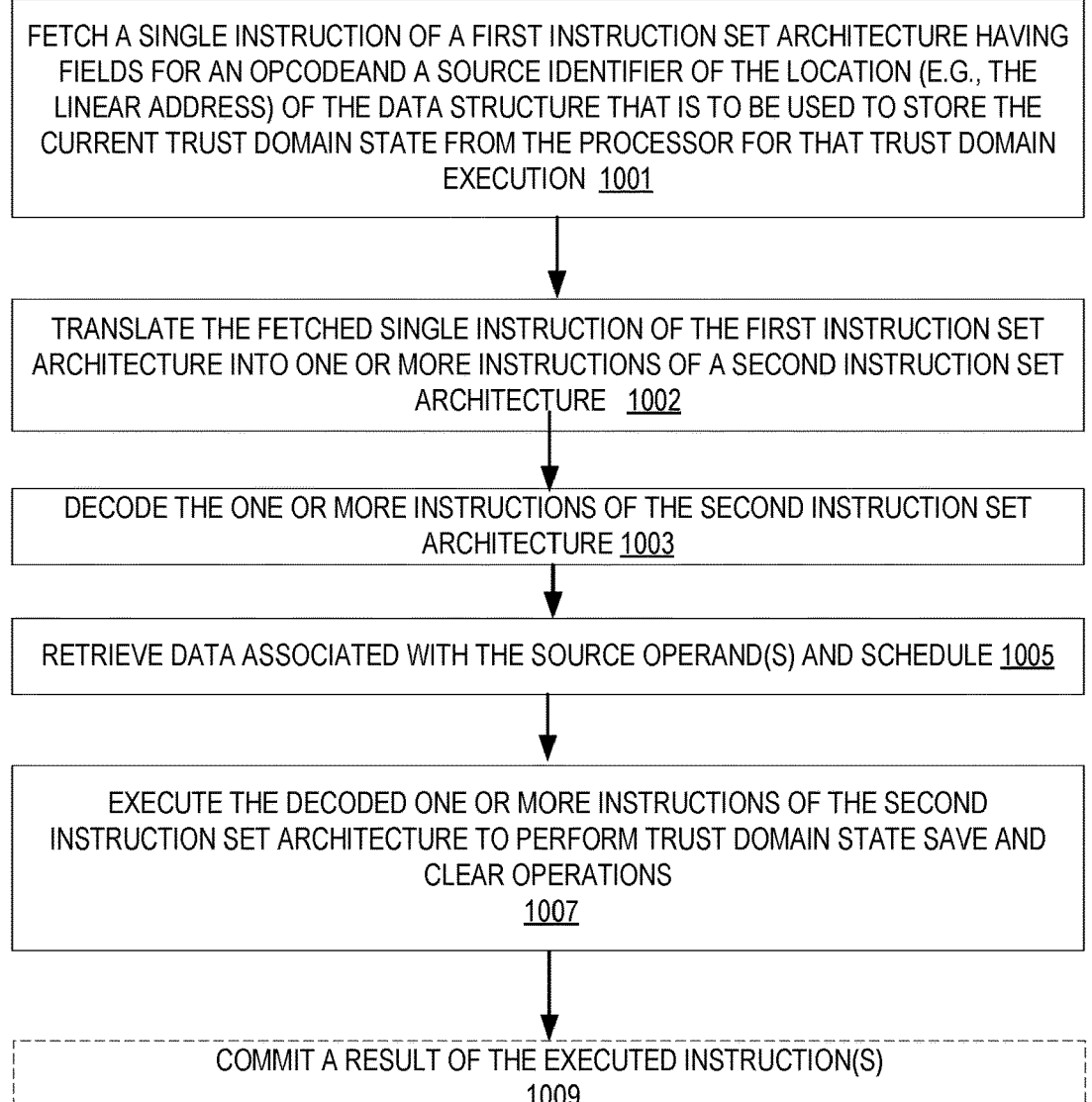

FETCH A SINGLE INSTRUCTION OF A FIRST INSTRUCTION SET ARCHITECTURE HAVING FIELDS FOR AN OPCODEAND A SOURCE IDENTIFIER OF THE LOCATION (E.G., THE LINEAR ADDRESS) OF THE DATA STRUCTURE THAT IS TO BE USED TO STORE THE CURRENT TRUST DOMAIN STATE FROM THE PROCESSOR FOR THAT TRUST DOMAIN EXECUTION 1001

TRANSLATE THE FETCHED SINGLE INSTRUCTION OF THE FIRST INSTRUCTION SET ARCHITECTURE INTO ONE OR MORE INSTRUCTIONS OF A SECOND INSTRUCTION SET ARCHITECTURE   1002

DECODE THE ONE OR MORE INSTRUCTIONS OF THE SECOND INSTRUCTION SET ARCHITECTURE 1003

RETRIEVE DATA ASSOCIATED WITH THE SOURCE OPERAND(S) AND SCHEDULE 1005

EXECUTE THE DECODED ONE OR MORE INSTRUCTIONS OF THE SECOND INSTRUCTION SET ARCHITECTURE TO PERFORM TRUST DOMAIN STATE SAVE AND CLEAR OPERATIONS
1007

COMMIT A RESULT OF THE EXECUTED INSTRUCTION(S)
1009

FIG. 10

PROCESSOR OR SOC 1200

SPECIAL PURPOSE LOGIC 1208

CORE 1202(A)

CACHE UNIT(S) 1204(A)

CORE 1202(N)

CACHE UNIT(S) 1204(N)

SHARED CACHE UNIT(S) 1206

INTERFACE NETWORK 1212

SYSTEM AGENT UNIT 1210

INTEGRATED MEMORY CONTROLLER UNIT(S) 1214

INTERFACE CONTROLLER UNIT(S) 1216

OTHER DEVICE(S) 1218

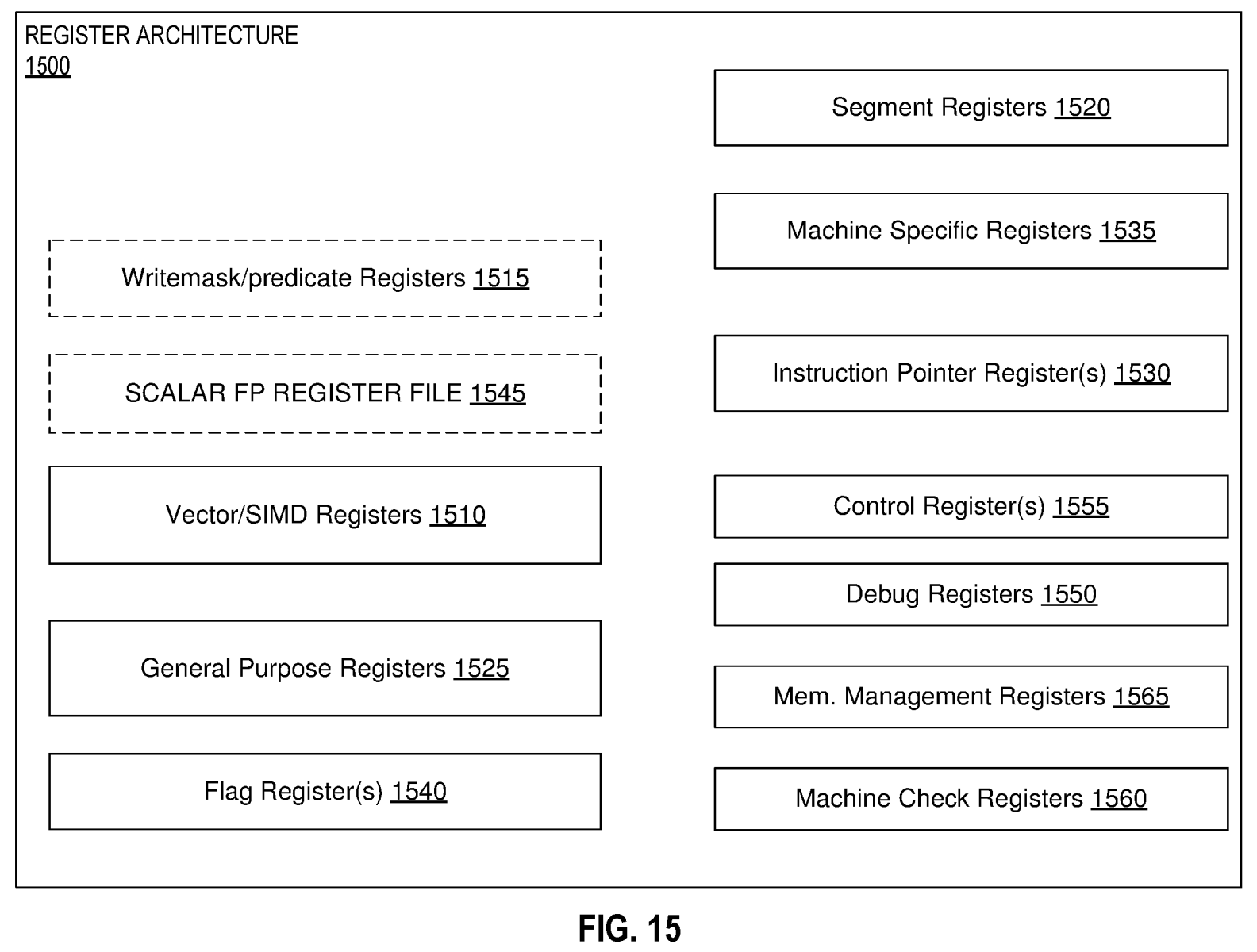

REGISTER ARCHITECTURE
1500

Segment Registers 1520

Machine Specific Registers 1535

Instruction Pointer Register(s) 1530

Control Register(s) 1555

Debug Registers 1550

Mem. Management Registers 1565

Machine Check Registers 1560

Writemask/predicate Registers 1515

SCALAR FP REGISTER FILE 1545

Vector/SIMD Registers 1510

General Purpose Registers 1525

Flag Register(s) 1540

FIG. 15

PREFIX(ES) 1601

OPCODE 1603

ADDRESSING INFORMATION 1605

DISPLACEMENT VALUE 1607

IMMEDIATE VALUE 1609

METHODS AND APPARATUSES FOR INSTRUCTIONS FOR A TRUST DOMAIN IMPLEMENTED BY A PROCESSOR

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, and exception handling, and external input and output (IO). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF DRAWINGS

Various examples in accordance with the present disclosure will be described with reference to the drawings, in which:

FIG. 3 illustrates an example of trust domain state according to examples of the disclosure.

FIG. 5 illustrates an example method performed by a processor to process a trust domain state enumeration instruction according to examples of the disclosure.

FIG. 6 illustrates an example method to process a trust domain state enumeration instruction using emulation or binary translation according to examples of the disclosure.

FIG. 7 illustrates an example method performed by a processor to process a trust domain state load instruction according to examples of the disclosure.

FIG. 8 illustrates an example method to process a trust domain state load instruction using emulation or binary translation according to examples of the disclosure.

FIG. 9 illustrates an example method performed by a processor to process a trust domain state save & clear instruction according to examples of the disclosure.

FIG. 10 illustrates an example method to process a trust domain state save & clear instruction using emulation or binary translation according to examples of the disclosure.

FIG. 15 is a block diagram of a register architecture according to some examples.

DETAILED DESCRIPTION

Figure 1:
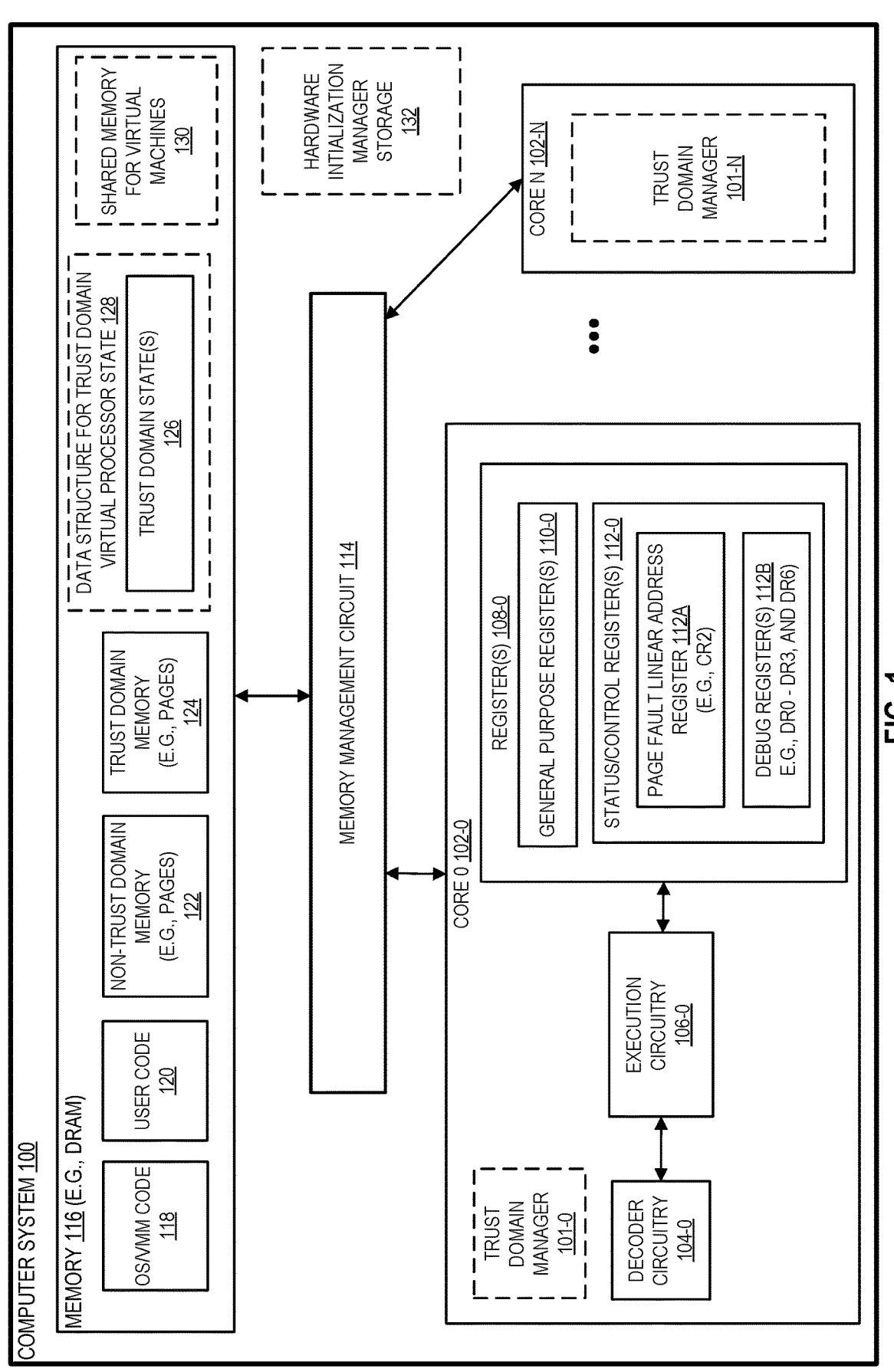
FIG. 1 illustrates a block diagram of a computer system including a plurality of cores having a trust domain manager to implement one or more trust domains and a memory including storage for a trust domain state according to examples of the disclosure.

The present disclosure relates to methods, apparatus, systems, and non-transitory computer-readable storage media for instructions for a trust domain implemented by a processor.

In the following description, numerous specific details are set forth. However, it is understood that examples of the disclosure may be practiced without these specific details. In other instances, well-known circuits, structures, and techniques have not been shown in detail in order not to obscure the understanding of this description.

References in the specification to "one example," "an example," "examples," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

A (e.g., hardware) processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. Certain operations include accessing one or more memory locations, e.g., to store and/or read (e.g., load) data. A system may include a plurality of cores, e.g., with a proper subset of cores in each socket of a plurality of sockets, e.g., of a system-on-a-chip (SoC). Each core (e.g., each processor or each socket) may access data storage (e.g., a memory). Memory may include volatile memory (e.g., dynamic random-access memory (DRAM)) or (e.g., byte-addressable) persistent (e.g., non-volatile) memory (e.g., non-volatile RAM) (e.g., separate from any system storage, such as, but not limited, separate from a hard disk drive). One example of persistent memory is a dual in-line memory module (DIMM) (e.g., a non-volatile DIMM), for example, accessible according to a Peripheral Component Interconnect Express (PCIe) standard.

In certain examples of computing, a virtual machine (VM) (e.g., guest) is an emulation of a computer system. In certain examples, VMs are based on a specific computer architecture and provide the functionality of an underlying physical computer system. Their implementations may involve specialized hardware, firmware, software, or a combination. In certain examples, a virtual machine monitor (VMM) (also known as a hypervisor) is a software program that, when executed, enables the creation, management, and governance of VM instances and manages the operation of a virtualized environment on top of a physical host machine. A VMM is the primary software behind virtualization environments and implementations in certain examples. When installed over a host machine (e.g., processor) in certain examples, a VMM facilitates the creation of VMs, e.g., each with separate operating systems (OS) and applications. The VMM may manage the backend operation of these VMs by allocating the necessary computing, memory, storage, and other input/output (IO) resources, such as, but not limited to, an input/output memory management unit (IOMMU) (e.g., an IOMMU circuit). The VMM may provide a centralized interface for managing the entire operation, status, and availability of VMs that are installed over a single host machine or spread across different and interconnected hosts.

It may be desirable to maintain the security (e.g., confidentiality) of information for a virtual machine from the VMM and/or other virtual machine(s). Certain processors (e.g., a system-on-a-chip (SoC) including a processor) utilize their hardware to isolate virtual machines, for example, with each referred to as a "trust domain" (e.g., a "trust zone", "secure environment", "trusted area", or "secure area"). Certain processors support an instruction set architecture (ISA) (e.g., ISA extension) to implement trust domains. For example, Intel® trust domain extensions (Intel® TDX) that utilize architectural elements to deploy hardware-isolated virtual machines (VMs) referred to as trust domains (TDs).

In certain examples, privileged system code (e.g., OS, VMM, and/or firmware) has access (e.g., to read and/or write) to memory that is storing data. This is a problem particularly where the data is to be kept private (e.g., the confidential information in memory for a trust domain) from the privileged (e.g., kernel/system level and/or not user level) system code. Certain examples herein (e.g., that implement trust domains) eliminate privileged software from the trusted compute base (TCB), e.g., the TCB of a TD.

In certain examples, a hardware processor (e.g., a trust domain manager thereof) and its ISA isolates TD VMs from the VMM (e.g., hypervisor) and/or other non-TD software (e.g., on the host platform). In certain examples, a hardware processor (e.g., a trust domain manager thereof) and its ISA implement trust domains to enhance confidential computing by helping protect the trust domains from a broad range of software attacks and reducing the trust domain's trusted computing base (TCB). In certain examples, a hardware processor (e.g., a trust domain manager thereof) and its ISA enhance a cloud tenant's control of data security and protection. In certain examples, a hardware processor (e.g., a trust domain manager thereof) and its ISA implement trust domains (e.g., trusted virtual machines) to enhance a cloud-service provider's (CSP) ability to provide managed cloud services without exposing tenant data to adversaries.

In certain examples, a processor (e.g., core) is to implement a trust domain manager, e.g., where the trust domain manager is to manage one or more trust domains (TDs) that are designed to be hardware isolated virtual machines (VMs), e.g., utilizing a set of ISA extensions (e.g., Intel® Trust Domain Extensions (Intel® TDX)).

However, in certain examples, while trust domains add security to computing, they add (e.g., time and power) overhead to entering and exiting a trust domain, e.g., where certain state of that trust domain is to be loaded into the trust domain and/or stored from the trust domain for later access on trust domain entry and/or exit. For examples, certain processors only allow a trust domain manager (e.g., implemented by a processor in Secure-Arbitration Mode (SEAM)) to access a trust domain (e.g., its private memory). A problem caused by this is that certain states of a processor (e.g., control states and/or debug states) are not loaded into the trust domain and/or stored from the trust domain for later access on trust domain entry and/or exit. One solution to this is to require, for trust domain entry and trust domain exit, the trust domain manager (e.g., SEAM VMM) to perform individual (e.g., discrete) instructions to save, clear, and load (e.g., restore) various processor (e.g., "ring-0") states, such as, but not limited to control states and/or debug states. In certain examples, these individual (e.g., discrete) instructions operations are done back-to-back, one at a time, and are generally defined as serializing instructions (e.g., serializing in memory and serializing in the processor's pipeline), making them extremely slow. Another issue is that doing each operation one at a time has a discrete overhead, and even more so when a serializing instruction is involved (e.g., each instruction has to stop and restart the front end, serialize the pipeline, fence (e.g., drain) loads and stores, etc.). In certain examples with trust domains, there are also certain checks for mode, etc. that are required and again are done for each state. In certain examples, a single move operation or write-read control register (e.g., WRMSR) operation takes several hundreds of cycles to complete, so multiple instructions can quickly add up to thousands of cycles with numerous (e.g., 10 or more) states to handle.

Examples herein are directed to instructions that overcome these problems by introducing decoder circuitry and execution circuitry to implement, e.g., allowing one of more of the operations to be performed by a single instruction (e.g., a single trust domain state enumeration instruction, a single trust domain state load instruction, and/or a single trust domain state save & clear instruction) in bulk for a fraction of the latency that it takes to do them individually. Examples herein thus decrease the performance overheads of entering and/or exiting a trust domain, e.g., such that the faster these transitions can become, the lower the overheads involved in moving to a trust domain based confidential computing solution. In certain examples, the instructions disclosed herein reduce the transitions into and/or out of a trust domain by thousands of processor (e.g., central processing unit (CPU)) cycles. Examples herein aggregate state operations together and allow execution of a trust domain state load instruction and/or a trust domain state save & clear instruction only by the trust domain manager (e.g., TDX module), and thus the reduction or elimination of these overhead issues.

The instructions disclosed herein are improvements to the functioning of a processor (e.g., of a computer) itself. Instruction decoder circuitry (e.g., a decoder) not having such an instruction as a part of its instruction set would not decode as discussed herein. An execution circuit not having such an instruction as a part of its instruction set would not execute as discussed herein. For example, a single "trust domain state enumeration" instruction that, when a processor decodes the single instruction into a decoded instruction and that decoded instruction is executed by the processor, causes the processor to store a value into a register to identify the control state and the debug state that (i) a trust domain state load instruction is to load from the data structure and/or (ii) a trust domain state store and clear instruction is to save into the data structure. For example, a single "trust domain load" instruction that, when a processor decodes the single instruction into a decoded instruction and that decoded instruction is executed by the processor, causes the processor to load the control state of the trust domain from a (e.g., trust domain) data structure into the control register and load the debug state of the trust domain from the (e.g., trust domain) data structure into the debug register. For example, a single "trust domain store and clear" instruction that, when a processor decodes the single instruction into a decoded instruction and that decoded instruction is executed by the processor, causes the processor to save the control state of the trust domain into the data structure from the control register and clear the control register, and store the debug state of the trust domain into the data structure from the debug register and clear the debug register. In certain examples, these instructions are only usable by a trust domain manager (e.g., SEAM root VMM), e.g., these instructions do not need to be virtualized.

In certain examples, the states are not only "machine (or model) specific register" (MSR) states. In certain examples, the state is a control state that includes a linear address that the trust domain attempted to access that caused a page fault (for example, from a control register, e.g., CR2). In certain examples, the state is a debug state (for example, from one or more debug registers, e.g., any of DR0 to DR7) (e.g., only debug registers DR0-DR3 and DR6). In certain examples, the instructions are implemented as (e.g., three respective) functions of a multiple function single instruction that allows implementation of one or more indicated functions (e.g., "leaf functions", e.g., an invoke SEAM operations (e.g., having a mnemonic of SEAMOPS) instruction.

In certain examples, such instructions are Intel® TDX instructions.

It should be understood that the functionality (e.g., instructions) herein may be added to other confidential computing technology, for example, to AMD® Secure Encrypted Virtualization (e.g., SEV) (e.g., Secure Encrypted Virtualization-Encrypted State (SEV-ES) and/or SEV-Secure Nested Paging (SEV-SNP)) or ARM® Realm Management Extension (RME). In certain examples, the confidential computing technology (e.g., AMD® SEV) uses one key per virtual machine to isolate guests and the hypervisor from one another, for example, where the keys are managed by a trust domain manager (e.g., AMD Secure Processor). In certain examples, the confidential computing (e.g., SEV) requires enablement in the guest operating system and hypervisor. In certain examples, the guest changes allow the virtual machine to indicate which pages in memory should be encrypted. In certain examples, the hypervisor changes use hardware virtualization instructions and communication with the trust domain manager (e.g., AMD Secure processor) to manage the appropriate keys in the memory controller. In certain examples, the confidential computing technology (e.g., ARM® Confidential Compute Architecture (ARM® CCA)) enables the construction of protected execution environments called realms, for example, where realms allow lower-privileged software, such as an application or a virtual machine, to protect its content and execution from attacks by higher-privileged software, such as an OS or a hypervisor.

Turning now to FIG. 1, an example system architecture is depicted. FIG. 1 illustrates a block diagram of a computer system including a plurality of cores having a trust domain manager to implement one or more trust domains and a memory including storage for a trust domain state according to examples of the disclosure.

FIG. 1 illustrates a block diagram of a computer system 100 including a plurality of cores 102-0 to 102-N (e.g., where N is any positive integer greater than one, although single core examples may also be utilized) having a trust domain manager (e.g., a single trust domain manager or distributed trust domain managers 101-0 to 101-N in each core, respectively) to implement one or more trust domains and a memory 116 including storage for a trust domain state 126 according to examples of the disclosure. In certain examples, each core includes (e.g., or logically includes) a set of registers, e.g., registers 108-0 for core 102-0, registers for core 102-N, etc. Registers 108 may be data registers and/or status/control registers, e.g., for each core (e.g., or each logical core of a plurality of logical cores of a physical core).

In certain examples, a (e.g., each) hardware processor core (e.g., core 102-0) includes a (i) hardware decoder circuitry 104-0 to decode (a) a trust domain state load instruction that is to load a trust domain state 126 for a particular trust domain into registers 118-0 (e.g., in status/control registers 112-0) from the data structure 128 (e.g., for trust domain virtual processor state) and/or (b) a trust domain state store and clear instruction is to save a trust domain state for a particular trust domain from registers 118-0 (e.g., from status/control registers 112-0) into the data structure 128 (e.g., as trust domain state 126), and then clear (at least those) registers 118-0 that stored the trust domain state, and/or (ii) a hardware execution circuitry 106-0 to execute the decoded instructions.

In certain examples, a (e.g., each) hardware processor core (e.g., core 102-0) includes a (i) hardware decoder circuitry 104-0 to decode a "trust domain state enumeration" instruction that is to cause the processor core 102-0 to store a value into a register 108-0 (e.g., general purpose register 110-0) (e.g., register "RAX") to identify the control state and the debug state that (a) a trust domain state load instruction is to load from the data structure and/or (b) a trust domain state store and clear instruction is to save into the data structure.

Depicted hardware processor core 102-0 includes one or more registers 108-0, for example, general purpose (e.g., data) register(s) 110-0 (e.g., registers RAX, RBX, RCX, RDX, etc.) and/or status/control register(s) 112-0, for example, page fault linear address register 112A (e.g., CR2 register) and/or debug register(s) 112B (e.g., DR0-DR7). In certain examples, when a page fault occurs (e.g., when a running program accesses a memory page that is not currently mapped to the virtual address space of a program), the linear address the program attempted to access is stored in the page fault linear address register 112A (e.g., CR2 register). In certain examples, debug register 112B includes one or more (e.g., any combination) of (i) debug address registers (e.g., DR0-DR3), e.g., where each of the debug-address registers (e.g., DR0 through DR3) stores the (e.g., 32-bit) (e.g., where breakpoint comparisons are made before physical address translation occurs) (e.g., in some examples, the contents of debug register DR7 further specifies breakpoint conditions), (ii) debug status register (e.g., DR6), e.g., where the debug status register stores a value that indicates one or more debug conditions that were sampled at the time the last debug exception was generated (e.g., where updates to this register only occur when an exception is generated) (e.g., where the flags in this register show the following information: bits 0 to 3 are set if a breakpoint condition detected: indicates (when set) that its associated breakpoint condition was met when a debug exception was generated, and these flags are set if the condition described for each breakpoint by the (e.g., LENn and R/Wn) flags in debug control register DR7 is true and/or they are set even if the breakpoint is not enabled by the Ln and Gn flags in register DR7), debug register access detected (BD) flag bit 13 is set when a debug register access is detected, e.g., indicates that the next instruction in the instruction stream accesses one of the debug registers (e.g., DR0 through DR7) and/or this bit (e.g., flag) is enabled when the general detect (GD) flag in debug control register DR7 is set), single step (BS) flag bit 14 indicates (when set) that the debug exception was triggered by the single-step execution mode (e.g., enabled with the TF flag in the EFLAGS register) and/or the single-step mode is the highest-priority debug exception (e.g., when the BS flag is set, any of the other debug status bits also may be set), and/or the task switch (BT) flag bit 15 indicates (when set) that the debug exception resulted from a task switch where the debug trap flag (T flag) in the Task-State Segment (TSS) of the target task was set (e.g., there is no flag in debug control register DR7 to enable or disable this exception; the T flag of the TSS is the only enabling flag), and/or (iii) debug control register (DR7) enables or disables breakpoints and sets breakpoint conditions.

In certain examples, the flags and fields in register DR7 control the following. In certain examples, L0 through L3 (local breakpoint enable) flags (e.g., bits 0, 2, 4, and 6) enables (when set) the breakpoint condition for the associated breakpoint for the current task. For example, when a breakpoint condition is detected and its associated Ln flag is set, a debug exception is generated. In certain examples, the processor automatically clears these flags on every task switch to avoid unwanted breakpoint conditions in the new task. In certain examples, G0 through G3 (global breakpoint enable) flags (e.g., bits 1, 3, 5, and 7) enables (when set) the breakpoint condition for the associated breakpoint for all tasks. In certain examples, when a breakpoint condition is detected and its associated Gn flag is set, a debug exception is generated. In certain examples, the processor does not clear these flags on a task switch, allowing a breakpoint to be enabled for all tasks. In certain examples, LE and GE (local and global exact breakpoint enable) flags (e.g., bits 8, 9) (when set), these flags cause the processor to detect the exact instruction that caused a data breakpoint condition. In certain examples, tor backward and forward compatibility with other x86 processors, the LE and GE flags are to be set to 1 if exact breakpoints are required. In certain examples, GD (general detect enable) flag (bit 13) enables (when set) debug register protection, which causes a debug exception to be generated prior to any move (MOV) instruction that accesses a debug register. In certain examples, when such a condition is detected, the BD flag in debug status register DR6 is set prior to generating the exception, e.g., where this condition is provided to support in-circuit emulators. In certain examples, when the emulator needs to access the debug registers, emulator software can set the GD flag to prevent interference from the program currently executing on the processor. In certain examples, the processor clears the GD flag upon entering to the debug exception handler, to allow the handler access to the debug registers. In certain examples, R/W0 through R/W3 (read/write) fields (e.g., bits 16, 17, 20, 21, 24, 25, 28, and 29) specifies the breakpoint condition for the corresponding breakpoint. In certain examples, the DE (debug extensions) flag in control register CR4 determines how the bits in the R/Wn fields are interpreted. In certain examples, when the DE flag is set, the processor interprets bits as follows: 00—Break on instruction execution only, 01—Break on data writes only, 10—Break on I/O reads or writes, and 11—Break on data reads or writes but not instruction fetches. In certain examples, when the DE flag is clear, the processor interprets the R/Wn bits as follows: 00—Break on instruction execution only, 01—Break on data writes only, 10—Undefined, and 11—Break on data reads or writes but not instruction fetches. In certain examples, LEN0 through LEN3 (Length) fields (e.g., bits 18, 19, 22, 23, 26, 27, 30, and 31) specify the size of the memory location at the address specified in the corresponding breakpoint address register (DR0 through DR3). In certain examples, these fields are interpreted as follows: 00—1-byte length, 01—2-byte length, 10—Undefined (or 8 byte length in certain examples), and 11—4-byte length. In certain examples, if the corresponding RWn field in register DR7 is 00 (instruction execution), then the LENn field should also be 00 (e.g., the effect of using other lengths is undefined).

In certain examples, one or more of the cores 102 are coupled to memory 116 via a memory management circuit 114. In certain examples, memory management circuit 114 is to control access (e.g., by the execution circuitry 106-0) to the (e.g., addressable memory of) memory 116 (e.g., to prevent access by a non-authorized component/code to trust domain state 126 and/or trust domain memory 124.

In certain examples, memory 116 is a memory local to the hardware processor (e.g., system memory). Memory 116 may be DRAM. In certain examples, memory 116 is a memory separate from the hardware processor, for example, memory of a server. Note that the figures herein may not depict all data communication connections. One of ordinary skill in the art will appreciate that this is to not obscure certain details in the figures. Note that a double headed arrow in the figures may not require two-way communication, for example, it may indicate one-way communication (e.g., to or from that component or device). Any or all combinations of communications paths may be utilized in certain examples herein.

Memory 116 contents may include operating system (OS) and/or virtual machine monitor code 118, user (e.g., program) code 120, non-trust domain memory 122 (e.g., pages), trust domain memory 124 (e.g., pages), (e.g., only accessible by a trust domain manager) storage 128 for a data structure for trust domain virtual processor states (e.g., respective set of trust domain state 126 for each active trust domain), a shared memory for virtual machines 130 (e.g., shared memory for trust domains), or any combination thereof. In certain examples of computing, a virtual machine (VM) is an emulation of a computer system. In certain examples, VMs are based on a specific computer architecture and provide the functionality of an underlying physical computer system. Their implementations may involve specialized hardware, firmware, software, or a combination. In certain examples, the virtual machine monitor (VMM) (also known as a hypervisor) is a software program that, when executed, enables the creation, management, and governance of VM instances and manages the operation of a virtualized environment on top of a physical host machine. A VMM is the primary software behind virtualization environments and implementations in certain examples. When installed over a host machine (e.g., processor) in certain examples, a VMM facilitates the creation of VMs, e.g., each with separate operating systems (OS) and applications. The VMM may manage the backend operation of these VMs by allocating the necessary computing, memory, storage, and other input/output (IO) resources, such as, but not limited to, an input/output memory management unit (IOMMU). The VMM may provide a centralized interface for managing the entire operation, status, and availability of VMs that are installed over a single host machine or spread across different and interconnected hosts. Similarly, an operating system may support multiple processes in separate address spaces defined by their respective paging structures to separate one process's memory pages from another process's memory pages.

In certain examples, the hardware initialization manager (non-transitory) storage 132 stores hardware initialization manager firmware (e.g., or software). In one example, the hardware initialization manager (non-transitory) storage 132 stores Basic Input/Output System (BIOS) firmware. In another example, the hardware initialization manager (non-transitory) storage 132 stores Unified Extensible Firmware Interface (UEFI) firmware. In certain examples (e.g., triggered by the power-on or reboot of a processor), computer system 100 (e.g., core 102-0) executes the hardware initialization manager firmware (e.g., or software) stored in hardware initialization manager (non-transitory) storage 132 to initialize the system 100 for operation, for example, to begin executing an operating system (OS) and/or initialize and test the (e.g., hardware) components of system 100.

In certain examples, a trusted execution environment (TEE) security manager (e.g., implemented by a trust domain manager 101) is to: provide interfaces to the VMM to assign memory, processor, and other resources to trust domains (e.g., trusted virtual machines), (ii) implements the security mechanisms and access controls (e.g., translation tables, etc.) to protect confidentiality and integrity of the trust domains (e.g., trusted virtual machines) data and execution state in the host from entities not in the trusted computing base of the trust domains (e.g., trusted virtual machines), (iii) uses a protocol to manage the security state of the trusted device interface (TDI) to be used by the trust domains (e.g., trusted virtual machines), (iv) establishing/managing IDE encryption keys for the host, and, if needed, scheduling key refreshes. TSM programs the IDE encryption keys into the host root ports and communicates with the DSM to configure integrity and data encryption (IDE) encryption keys in the device, (v) or any single or combination thereof. In certain examples, a TEE security manager (e.g., also) provides authentication and attestation services where code and data are measured, and the measurement is sent to a remote entity to prove the code and data is loaded and running in the TEE on an authenticated machine.

In certain examples, an endpoint's (e.g., code's) "measurement" describes the process of calculating the cryptographic hash value of a piece of firmware/software or configuration data and linking the cryptographic hash value with the trusted execution environment endpoint identity through the use of digital signatures. This allows an authentication initiator to establish that the identity and measurement of the firmware/software or configuration running on the authenticated trusted execution environment endpoint.

In certain examples, to help enforce the security policies for the TDs, a new mode of a processor called Secure-Arbitration Mode (SEAM) is introduced to host a (e.g., manufacturer provided) digitally signed, but not necessarily encrypted, security-services module. In certain examples, a trust domain manager (TDM) 101 is hosted in a reserved, memory space identified by a SEAM-range register (SEAMRR). In certain examples, the processor only allows access to SEAM-memory range to software executing inside the SEAM-memory range, and all other software accesses and direct-memory access (DMA) from devices to this memory range are aborted. In certain examples, a SEAM module does not have any memory-access privileges to other protected, memory regions in the platform, including the System-Management Mode (SMM) memory or (e.g., Intel® Software Guard Extensions (SGX)) protected memory.

In certain examples, trust domain manager (e.g., trust domain manager 101-0 to 101-N) assigns a VEK to each virtual machine (e.g., trust domain) to maintain the confidentiality of each virtual machine. As discussed further herein, in certain examples, trust domain manager (e.g., trust domain manager 101-0 to 101-N) allows the processing of a trust domain state enumeration instruction, trust domain state load instruction, and/or trust domain state save & clear instruction (or corresponding SEAM function(s) therefor). In certain examples, an invoke SEAM operations (SEAMOPS) instruction is used to execute SEAM-specific operations (e.g., in SEAM VMX root operation). In certain examples, the SEAMOPS instruction is only executable by privileged software running in SEAM VMX root operation and invokes one or more (e.g., "leaf") functions to perform the requested functionality. In certain examples, a particular SEAM function is selected by setting a corresponding value in a register (e.g., RAX). In certain examples, a SEAM function (e.g., RAX=0) causes the return of a bitmap of the supported SEAMOPS functions (e.g., leaves). In certain examples, a SEAM function (e.g., RAX=1) causes a SEAM-REPORT structure to be generated, e.g., that stores the measurements and/or configurations of the SEAM (e.g., trust domain manager and any additional components of the trusted computing base (TCB)).

In certain examples, a SEAM function (e.g., RAX=8) causes execution of a trust domain load (TDSTATE_LOAD) operation that is to load a trust domain state 126 for a particular trust domain into registers 118-0 (e.g., in status/control registers 112-0) from the data structure 128 (e.g., for trust domain virtual processor state). In certain examples, this SEAM function includes an operand of a data register (e.g., RCX) that is to store a linear address of the data structure 128 (e.g., the source to store the to-be-loaded trust domain state 126).

In certain examples, a SEAM function (e.g., RAX=9) causes execution of a trust domain store and clear (TD-STATE_SAVE_CLEAR) operation that is to save a trust domain state for a particular (e.g., currently executing) trust domain from registers 118-0 (e.g., from status/control registers 112-0) into the data structure 128 (e.g., as trust domain state 126), and then clear (at least those) registers 118-0 that stored the trust domain state. In certain examples, this SEAM function includes an operand of a data register (e.g., RCX) that is to store a linear address of the data structure 128 (e.g., the destination to store the trust domain state 126). In certain examples, clearing by the trust domain store and clear (TDSTATE_SAVE_CLEAR) operation (or single corresponding instruction) is not limited to storing all zeroes into the to-be-cleared registers, e.g., a reset value is stored into those registers, see, e.g., FIG. 3. In certain examples, the trust domain store and clear (TDSTATE_SAVE_CLEAR) operation allows the saving and clearing via one SEAM operation, e.g., useful for sanitizing these states prior to a trust domain exit.

In certain examples, a SEAM function (e.g., RAX=7) causes execution of a "trust domain state enumeration" (TDSTATE_ENUM) operation that is to store a value into a register (e.g., RAX) to identify the control state and/or the debug state that (a) a trust domain load (TDSTATE_LOAD) operation that that is to load from the data structure and/or (b) a trust domain store and clear (TDSTATE_SAVE_CLEAR) operation is to save into the data structure.

In certain examples, the SEAM operations are only requestable by executing a SEAMOPS instruction (e.g., SEAM VMX-root mode only instruction).

In certain examples, privileged system code (e.g., OS and/or VMM code 118) is to provide (e.g., allocate) memory to the trust domain manager 101 for use by a trust domain to insert code and/or data.

Figure 2:
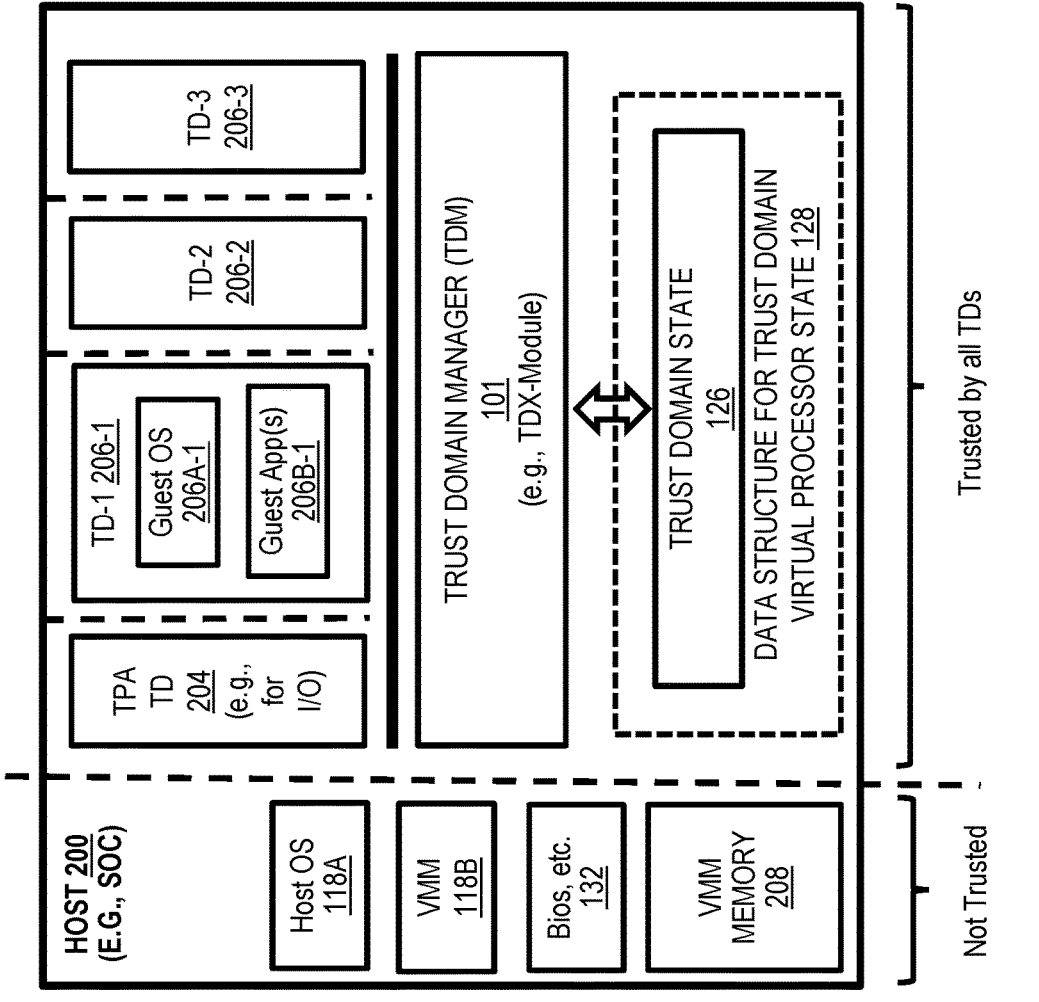
FIG. 2 illustrates a block diagram of a host including a trust domain manager and storage for a data structure for a trust domain state according to examples of the disclosure.

FIG. 2 illustrates a block diagram of a host including a trust domain manager 101 and storage for a data structure 128 for a trust domain state 126 according to examples of the disclosure. In certain examples, host 200 implements a (input/output (I/O)) trusted provisioning agent (TPA) 204 of trust domains, and a plurality of trust domains, shown as trust domain "1" 206-1, trust domain "2" 206-2, and trust domain "3" 206-3, although any single or plurality of trust domains may be implemented. In certain examples, host 200 includes a trust domain manager 101 to manage the trust domains (for example, with the vertical dashed lines indicating isolation therebetween the trust domains, e.g., and host OS 118A, VMM 118B, BIOS 132, VMM memory 208 (e.g., non-secure memory), etc.). In certain examples, the virtual machine monitor 118B manages (e.g., generates) one or more virtual machines, e.g., with the trust domain manager 101 isolating a first virtual machine as a first trust domain from a second (or more) virtual machine as a second (or more) trust domain(s). In certain examples, the trust domain manager 101 is trusted by each trust domain, e.g., a trust domain does not trust another trust domain. In certain examples, each trust domain of a plurality of trust domains includes its own respective trust domain state 126.

In certain examples, a trust domain has both a private memory (e.g., in trust domain memory 124 in FIG. 1) and a shared memory 130 (e.g., in trust domain memory 124 in FIG. 1). In certain examples, trust domain manager 101 accesses the data structure 128 (e.g., the source to store the to-be-loaded trust domain state 126 and the destination to store the to-be-stored trust domain state 126), e.g., as requested by a trust domain state instruction (or SEAM function) disclosed herein.

FIG. 3 illustrates an example of trust domain state 126 according to examples of the disclosure. The depicted trust domain state 126 includes examples fields (e.g., names) of values that are to be (i) saved from certain state registers (e.g., corresponding registers of registers 108) of a processor that implements a trust domain where the processor (e.g., logical processor) is using and/or accessing that state, and/or (ii) loaded into certain state registers (e.g., corresponding registers of registers 108) of a processor that is to implement a corresponding trust domain where the processor (e.g., logical processor) is to use and/or access that state. Note that superscript 1 indicates that the debug register DR6, in certain examples, is to be reset by a store of a particular zero bit and non-zero bit value into the control register (e.g., 0xFFFF0FF0), e.g., certain bits are not settable. Note that superscript 2 indicates that those registers (e.g., values therein), in certain examples, are forced to be canonical addresses (e.g., in 64-bit mode, an address is considered to be in canonical form if address bits 63 through to the most-significant implemented bit by the microarchitecture are set to either all ones or all zeros). Note that superscript 3 indicates that those registers (e.g., values therein), in certain examples, have their upper (e.g., 32 bits) ignored.

In certain examples, the offset is the number of bytes where each respective state value (for a corresponding state register) is stored at relative to the address of the trust domain state 126 in the data structure 128.

In certain examples, the data structure 128 (e.g., trust domain state 126 format) can be augmented in the future to add additional states, e.g., to be managed while maintaining existing compatibility.

In certain examples, a trust domain manager uses a multi-page structure to store a TD Virtual CPU (VCPU) state, e.g., referred to as the TDVPS. In certain examples, TDVPS pages are allocated by the host VMM via the trust domain manager, e.g., but their content is intended to be non-architectural and not directly accessible to software (e.g., user or system) (e.g., only accessible by trust domain manager).

In certain examples, a trust domain manager (e.g., TDX Module) is to perform (i) TDVPS Initialization (e.g., where TD states are setup for the first time in TDVPS (which will also be applied to the trust domain state 126 structure), (ii) perform a trust domain entry (e.g., via loading a trust domain's extended states via TDSTATE_LOAD), and (e.g., after using that trust domain), (iii) perform a trust domain exit (e.g., save TD extended states via TDSTATE_SAVE_CLEAR that also resets extended states).

In certain examples, the trust domain state 126 includes one or more (e.g., any combination of) trust domain state (identified by the register the state value is to be used in) of a: (e.g., IA32_DS_AREA MSR) value that points to a debug store (DS) buffer management area (e.g., used to manage a branch trace store (BTS) buffer and/or processor event-based sampling (PEBS) buffer), (e.g., IA32_STAR MSR) value that indicates system (e.g., Ring 0) and user (e.g., Ring 3) segment bases (e.g., and a system call (SYSCALL) instruction pointer (IP or EIP)), (e.g., a IA32_LSTAR MSR) value that points to a kernel's SYSCALL entry (e.g., for 64 bit software), (e.g., IA32_KERNEL_GSBASE MSR) value that points to a general segment (GS) register that stores a base address to a structure containing per-CPU data (e.g., to manage thread-specific memory), (e.g., IA32_TSC_AUX MSR) value that provides a (e.g., 32-bit) field that is initialized by privileged software with a signature value (for example, a logical processor ID), and/or (e.g., IA32_FMASK MSR) value where certain (e.g., the low 32 bits) are the SYSCALL flag mask (e.g., where if a bit in this is set, the corresponding bit in a flags register (e.g., rFLAGS) is cleared, e.g., flag registers 1540).

In certain examples, a processor includes a time-stamp counter (TSC) mechanism to monitor and identify the relative time occurrence of processor events. An example usage of IA32_TSC_AUX (e.g., that value therefrom) in conjunction with IA32_TSC (not "AUX") is to allow software to read the (e.g., 64-bit) time stamp in IA32_TSC and signature value in IA32_TSC_AUX with an instruction (e.g., RDTSCP) in an atomic operation. In certain examples, this (e.g., RDTSCP) instruction returns the (e.g., 64-bit) time stamp in EDX:EAX and the (e.g., 32-bit) TSC_AUX signature value in ECX, such that he atomicity of RDTSCP ensures that no context switch can occur between the reads of the TSC and TSC_AUX values.

Figure 4:
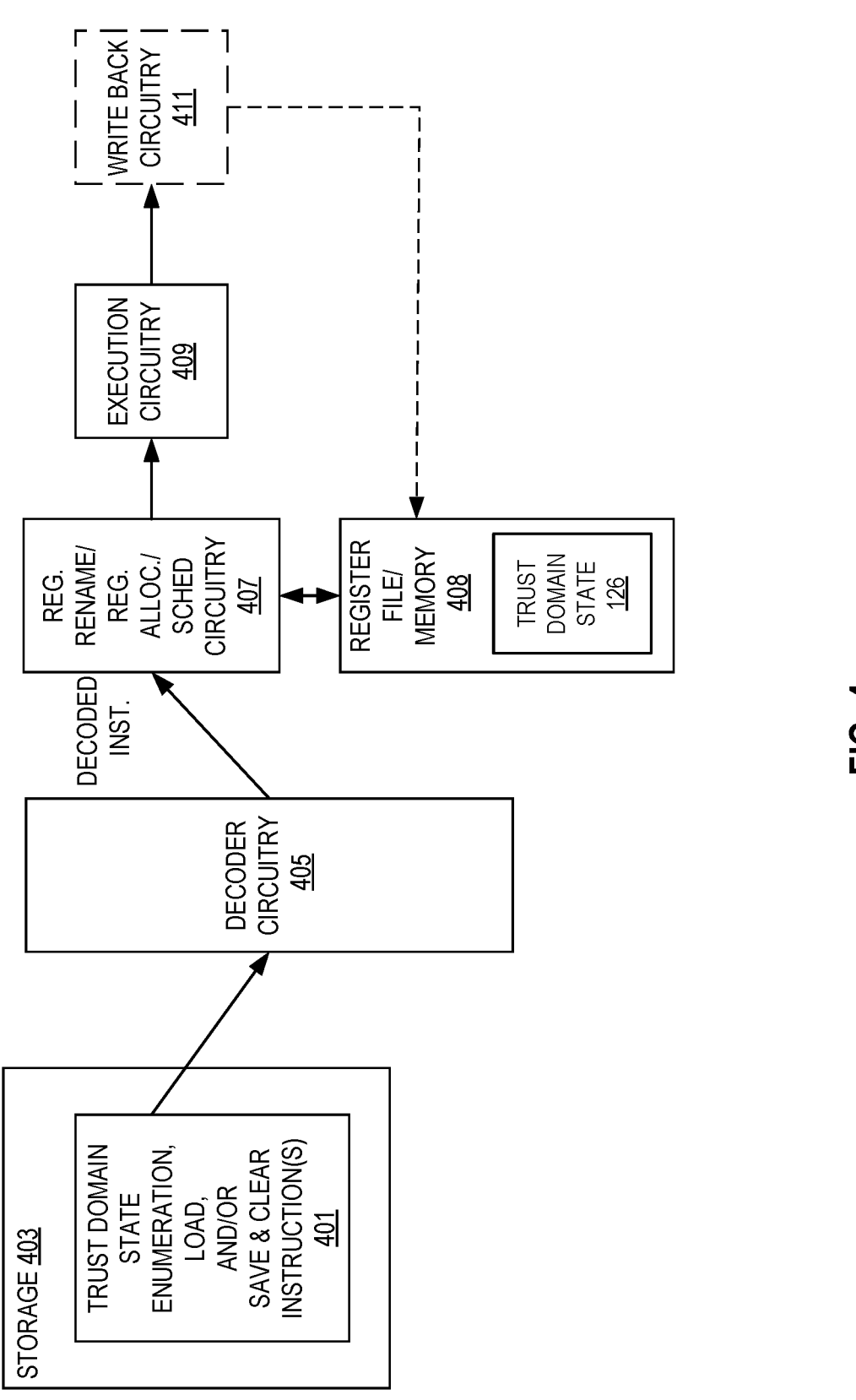
FIG. 4 illustrates examples of computing hardware to process a trust domain state enumeration instruction, trust domain state load instruction, and/or trust domain state save & clear instruction (or SEAM function) according to examples of the disclosure.

FIG. 4 illustrates examples of computing hardware to process a trust domain state enumeration instruction, trust domain state load instruction, and/or trust domain state save & clear instruction 401 (or SEAM function) according to examples of the disclosure. The instruction 401 may be a trust domain state enumeration instruction, such as a TDSTATE_ENUM instruction. The instruction 401 may be a trust domain state load instruction, such as a TDSTATE_LOAD instruction. The instruction may be a trust domain state save & clear instruction 401, such as a TDSTATE_SAVE_CLEAR instruction. As illustrated, storage 403 stores a trust domain state enumeration instruction, trust domain state load instruction, and/or trust domain state save & clear instruction (or SEAM function) 401 to be executed.

The instruction(s) 401 is received by decoder circuitry 405. For example, the decoder circuitry 405 receives this instruction from fetch circuitry (not shown). The instruction may be in any suitable format, such as that describe with reference to FIG. 16 below.

In an example, a trust domain state enumeration (TDSTA-TE_ENUM) instruction 401 includes fields for an opcode and a destination identifier of a location (e.g., register) to store a value that indicates which trust domain state is to be (i) loaded by a trust domain state load instruction and/or (ii) stored by a trust domain store and clear instruction. In some examples, the opcode details the trust domain state enumeration operations to be performed. In some examples, TDSTATE_ENUM is the opcode mnemonic of the instruction.

In an example, a trust domain state load (TDSTATE_LOAD) instruction 401 includes fields for an opcode and a source identifier of a location (e.g., the linear address) of the data structure storing the trust domain state that is to-be-loaded into the processor for that trust domain execution. In some examples, the opcode details the trust domain state load operations to be performed. In some examples, TDSTATE_LOAD is the opcode mnemonic of the instruction.

In an example, a trust domain state save and clear (TDSTATE_SAVE_CLEAR) instruction 401 includes fields for an opcode and a source identifier of the location (e.g., the linear address) of the data structure that is to be used to store the current trust domain state from the processor for that trust domain execution. In some examples, the opcode details the trust domain state save and clear operations to be performed. In some examples, TDSTATE_SAVE_CLEAR is the opcode mnemonic of the instruction.

In an embodiment where the operations of the instructions 401 are implemented as a function (e.g., leaf) of a SEAM-OPS operation, the instruction includes a source operand (e.g., RAX) that indicates which function (e.g., leaf) is to be executed.

In some examples, the sources and destination are registers, and in other examples one or more are memory locations. In some examples, one or more of the sources may be an immediate operand.

More detailed examples of at least one instruction format for the instructions will be detailed later. The decoder circuitry 405 decodes each instruction into one or more operations. In some examples, this decoding includes generating a plurality of micro-operations to be performed by execution circuitry (such as execution circuitry 409). The decoder circuitry 405 also decodes instruction prefixes.

In some examples, register renaming, register allocation, and/or scheduling circuitry 407 provides functionality for one or more of: 1) renaming logical operand values to physical operand values (e.g., a register alias table in some examples), 2) allocating status bits and flags to the decoded instruction, and 3) scheduling the decoded instruction for execution by execution circuitry out of an instruction pool (e.g., using a reservation station in some examples).

Registers (register file) and/or memory 408 store data (e.g., trust domain state 126) as operands of the instruction to be operated by execution circuitry 409. Example register types include packed data registers, general purpose registers (GPRs), and floating-point registers.

Execution circuitry 409 executes the decoded instruction. Example detailed execution circuitry includes execution circuitry 106-0 shown in FIG. 1, and execution cluster(s) 1360 shown in FIG. 13B, etc.

In certain examples, the execution of the decoded trust domain state enumeration instruction 401 causes the processor (e.g., trust domain manager) to store a value that indicates which trust domain state is to be (i) loaded by a trust domain state load instruction and/or (ii) stored by a trust domain store and clear instruction.

In certain examples, the execution of the decoded trust domain state load instruction 401 causes the processor (e.g., trust domain manager) to load the trust domain state 126 into the processor for that trust domain execution.

In certain examples, the execution of the decoded trust domain state save and clear instruction 401 causes the processor (e.g., trust domain manager) to save a trust domain's state from the processor into the trust domain state 126 and then clear the respective source(s) for that state from the processor.

In some examples, retirement/write back circuitry 411 architecturally commits the destination register into the registers or memory 408 and retires the instruction.

FIG. 5 illustrates an example method performed by a processor to process a trust domain state enumeration instruction. For example, a processor core as shown in FIG. 1, FIG. 13B, a pipeline as detailed below, etc., performs this method.

At 501, an instance of single instruction is fetched. For example, a trust domain state enumeration instruction is fetched. The instruction includes fields for an opcode and a destination operand (e.g., register) to store a value that indicates which trust domain state is to be (i) loaded by a trust domain state load instruction and/or (ii) stored by a trust domain store and clear instruction. In some examples, the instruction further includes a field for a writemask. In some examples, the instruction is fetched from an instruction cache. The opcode indicates the trust domain state enumeration operations to perform.

The fetched instruction is decoded at 503. For example, the fetched trust domain state enumeration instruction is decoded by decoder circuitry such as decoder circuitry 104-0, decoder circuitry 405, or decode circuitry 1340 detailed herein.

Data values associated with any source operands of the decoded instruction are retrieved when the decoded instruction is scheduled at 505. For example, when one or more of the source operands are memory operands, the data from the indicated memory location is retrieved.

At 507, the decoded instruction is executed by execution circuitry (hardware) such as execution circuitry 106-0 shown in FIG. 1, execution circuitry 409 shown in FIG. 4, or execution cluster(s) 1360 shown in FIG. 13B. For the trust domain state enumeration instruction, the execution will cause execution circuitry to perform the operations described in connection with FIGS. 1-3.

In some examples, the instruction is committed or retired at 509.

FIG. 6 illustrates an example method to process a trust domain state enumeration instruction using emulation or binary translation. For example, a processor core as shown in FIG. 13B, a pipeline and/or emulation/translation layer perform aspects of this method.

An instance of a single instruction of a first instruction set architecture is fetched at 601. The instance of the single instruction of the first instruction set architecture includes fields for an opcode and a destination operand (e.g., register) to store a value that indicates which trust domain state is to be (i) loaded by a trust domain state load instruction and/or (ii) stored by a trust domain store and clear instruction. In some examples, the instruction further includes a field for a writemask. In some examples, the instruction is fetched from an instruction cache. The opcode indicates trust domain state enumeration operations to perform.

Figure 22:
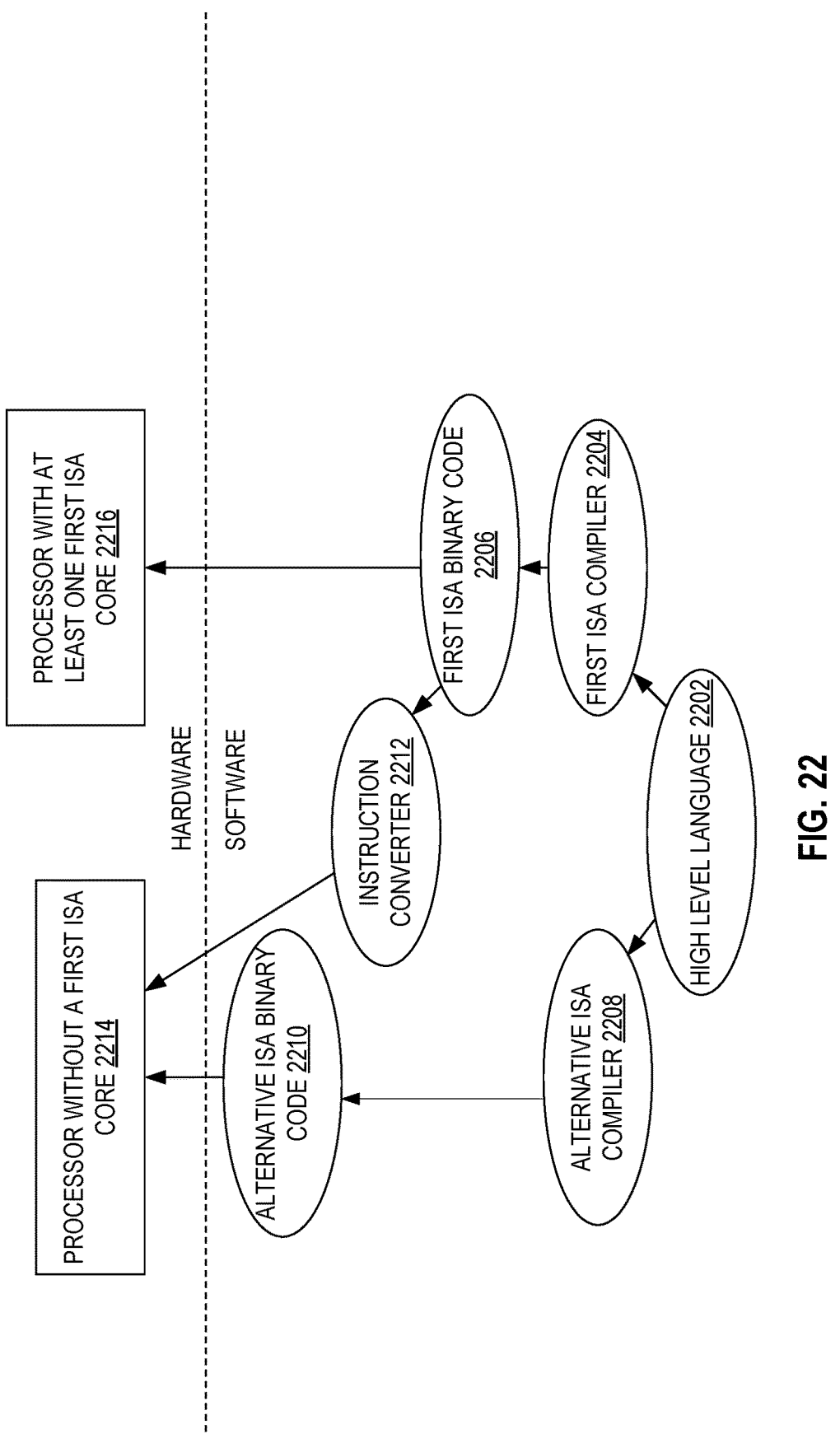
FIG. 22 is a block diagram illustrating the use of a software instruction converter to convert binary instructions in a source instruction set architecture to binary instructions in a target instruction set architecture according to examples.

The fetched single instruction of the first instruction set architecture is translated into one or more instructions of a second instruction set architecture at 602. This translation is performed by a translation and/or emulation layer of software in some examples. In some examples, this translation is performed by an instruction converter 2212 as shown in FIG. 22. In some examples, the translation is performed by hardware translation circuitry.

The one or more translated instructions of the second instruction set architecture are decoded at 603. For example, the translated instructions are decoded by decoder circuitry such as decoder circuitry 104-0, decoder circuitry 405, or decode circuitry 1340 detailed herein. In some examples, the operations of translation and decoding at 602 and 603 are merged.

Data values associated with the source operand(s) of the decoded one or more instructions of the second instruction set architecture are retrieved and the one or more instructions are scheduled at 605. For example, when one or more of the source operands are memory operands, the data from the indicated memory location is retrieved.

At 607, the decoded instruction(s) of the second instruction set architecture is/are executed by execution circuitry (hardware) such as execution circuitry 106-0 shown in FIG. 1, execution circuitry 409 shown in FIG. 4, or execution cluster(s) 1360 shown in FIG. 13B, to perform the operation(s) indicated by the opcode of the single instruction of the first instruction set architecture. For the trust domain state enumeration instruction, the execution will cause execution circuitry to perform the operations described in connection with FIGS. 1-3.

In some examples, the instruction is committed or retired at 609.

FIG. 7 illustrates an example method performed by a processor to process a trust domain state load instruction. For example, a processor core as shown in FIG. 1, FIG. 13B, a pipeline as detailed below, etc., performs this method.

At 701, an instance of single instruction is fetched. For example, a trust domain state load instruction is fetched. The instruction includes fields for an opcode and a source identifier of a location (e.g., the linear address) of the data structure storing the trust domain state that is to-be-loaded into the processor for that trust domain execution. In some examples, the instruction further includes a field for a writemask. In some examples, the instruction is fetched from an instruction cache. The opcode indicates trust domain state load operations to perform.

The fetched instruction is decoded at 703. For example, the fetched trust domain state load instruction is decoded by decoder circuitry such as decoder circuitry 104-0, decoder circuitry 405, or decode circuitry 1340 detailed herein.

Data values associated with the source operands of the decoded instruction are retrieved when the decoded instruction is scheduled at 705. For example, when one or more of the source operands are memory operands, the data from the indicated memory location is retrieved.

At 707, the decoded instruction is executed by execution circuitry (hardware) such as execution circuitry 106-0 shown in FIG. 1, execution circuitry 409 shown in FIG. 4, or execution cluster(s) 1360 shown in FIG. 13B. For the trust domain state load instruction, the execution will cause execution circuitry to perform the operations described in connection with FIGS. 1-3.

In some examples, the instruction is committed or retired at 709.

FIG. 8 illustrates an example method to process a trust domain state load instruction using emulation or binary translation. For example, a processor core as shown in FIG. 13B, a pipeline and/or emulation/translation layer perform aspects of this method.

An instance of a single instruction of a first instruction set architecture is fetched at 801. The instance of the single instruction of the first instruction set architecture includes fields for an opcode and a source identifier of a location (e.g., the linear address) of the data structure storing the trust domain state that is to-be-loaded into the processor for that trust domain execution. In some examples, the opcode details the trust domain state load operations to be performed. In some examples, the instruction further includes a field for a writemask. In some examples, the instruction is fetched from an instruction cache. The opcode indicates trust domain state load operations to perform.

The fetched single instruction of the first instruction set architecture is translated into one or more instructions of a second instruction set architecture at 802. This translation is performed by a translation and/or emulation layer of software in some examples. In some examples, this translation is performed by an instruction converter 2212 as shown in FIG. 22. In some examples, the translation is performed by hardware translation circuitry.

The one or more translated instructions of the second instruction set architecture are decoded at 803. For example, the translated instructions are decoded by decoder circuitry such as decoder circuitry 104-0, decoder circuitry 405, or decode circuitry 1340 detailed herein. In some examples, the operations of translation and decoding at 802 and 803 are merged.

Data values associated with the source operand(s) of the decoded one or more instructions of the second instruction set architecture are retrieved and the one or more instructions are scheduled at 805. For example, when one or more of the source operands are memory operands, the data from the indicated memory location is retrieved.

At 807, the decoded instruction(s) of the second instruction set architecture is/are executed by execution circuitry (hardware) such as execution circuitry 106-0 shown in FIG. 1, execution circuitry 409 shown in FIG. 4, or execution cluster(s) 1360 shown in FIG. 13B, to perform the operation(s) indicated by the opcode of the single instruction of the first instruction set architecture. For the trust domain state load instruction, the execution will cause execution circuitry to perform the operations described in connection with FIGS. 1-3.

In some examples, the instruction is committed or retired at 809.

FIG. 9 illustrates an example method performed by a processor to process a trust domain state save and clear instruction. For example, a processor core as shown in FIG. 1, FIG. 13B, a pipeline as detailed below, etc., performs this method.

At 901, an instance of single instruction is fetched. For example, a trust domain state save and clear instruction is fetched. The instruction includes fields for an opcode and a source identifier of the location (e.g., the linear address) of the data structure that is to be used to store the current trust domain state from the processor for that trust domain execution. In some examples, the instruction further includes a field for a writemask. In some examples, the instruction is fetched from an instruction cache. The opcode indicates trust domain state save and clear operations to perform.

The fetched instruction is decoded at 903. For example, the fetched trust domain state save and clear instruction is decoded by decoder circuitry such as decoder circuitry 104-0, decoder circuitry 405, or decode circuitry 1340 detailed herein.

Data values associated with the source operands of the decoded instruction are retrieved when the decoded instruction is scheduled at 905. For example, when one or more of the source operands are memory operands, the data from the indicated memory location is retrieved.

At 907, the decoded instruction is executed by execution circuitry (hardware) such as execution circuitry 106-0 shown in FIG. 1, execution circuitry 409 shown in FIG. 4, or execution cluster(s) 1360 shown in FIG. 13B. For the trust domain state save and clear instruction, the execution will cause execution circuitry to perform the operations described in connection with FIGS. 1-3.

In some examples, the instruction is committed or retired at 909.

FIG. 10 illustrates an example method to process a trust domain state save and clear instruction using emulation or binary translation. For example, a processor core as shown in FIG. 13B, a pipeline and/or emulation/translation layer perform aspects of this method.

An instance of a single instruction of a first instruction set architecture is fetched at 1001. The instance of the single instruction of the first instruction set architecture includes fields for an opcode and a source identifier of the location (e.g., the linear address) of the data structure that is to be used to store the current trust domain state from the processor for that trust domain execution. In some examples, the instruction further includes a field for a writemask. In some examples, the instruction is fetched from an instruction cache. The opcode indicates trust domain state save and clear operations to perform.

The fetched single instruction of the first instruction set architecture is translated into one or more instructions of a second instruction set architecture at 1002. This translation is performed by a translation and/or emulation layer of software in some examples. In some examples, this translation is performed by an instruction converter 2212 as shown in FIG. 22. In some examples, the translation is performed by hardware translation circuitry.

The one or more translated instructions of the second instruction set architecture are decoded at 1003. For example, the translated instructions are decoded by decoder circuitry such as decoder circuitry 104-0, decoder circuitry 405, or decode circuitry 1340 detailed herein. In some examples, the operations of translation and decoding at 1002 and 1003 are merged.

Data values associated with the source operand(s) of the decoded one or more instructions of the second instruction set architecture are retrieved and the one or more instructions are scheduled at 1005. For example, when one or more of the source operands are memory operands, the data from the indicated memory location is retrieved.

At 1007, the decoded instruction(s) of the second instruction set architecture is/are executed by execution circuitry (hardware) such as execution circuitry 106-0 shown in FIG. 1, execution circuitry 409 shown in FIG. 4, or execution cluster(s) 1360 shown in FIG. 13B, to perform the operation(s) indicated by the opcode of the single instruction of the first instruction set architecture. For the trust domain state save and clear instruction, the execution will cause execution circuitry to perform the operations described in connection with FIGS. 1-3.

In some examples, the instruction is committed or retired at 1009.

Exemplary architectures, systems, etc. that the above may be used in are detailed below. Exemplary instruction formats that may cause any of the operations herein are detailed below.

At least some examples of the disclosed technologies can be described in view of the following examples:

Example 1. An apparatus comprising:

a hardware processor core to implement a trust domain manager to manage one or more hardware isolated virtual machines as a respective trust domain with a region of protected memory, and a virtual machine monitor that is not allowed access to the region of protected memory of the one or more hardware isolated virtual machines;

a debug register of the hardware processor core;

a control register of the hardware processor core;

decoder circuitry of the hardware processor core to decode a first single instruction into a first decoded instruction, the first single instruction having a field to indicate a data structure to store a control state of a trust domain and a debug state of the trust domain, and an opcode to indicate execution circuitry is to load the control state of the trust domain from the data structure into the control register and load the debug state of the trust domain from the data structure into the debug register; and the execution circuitry of the hardware processor core to execute the first decoded instruction according to the opcode.

Example 2. The apparatus of example 1, wherein the control state comprises a linear address that the trust domain attempted to access that caused a page fault.

Example 3. The apparatus of any one of examples 1-2, wherein the debug state comprises a pointer to a debug save area to store branch records for the trust domain and processor event-based sampling records for the trust domain.

Example 4. The apparatus of any one of examples 1-3, wherein the first single instruction further comprises a field to indicate the load of the control state of the trust domain from the data structure into the control register and the load the debug state of the trust domain from the data structure into the debug register are a first function of multiple selectable trust domain functions of the first single instruction.

Example 5. The apparatus of any one of examples 1-4, wherein the field is to indicate a register to store a linear address of the data structure.

Example 6. The apparatus of any one of examples 1-5, wherein:

the decoder circuitry of the hardware processor core is to decode a second single instruction into a second decoded instruction, the second single instruction having a field to indicate a data structure to store the control state of the trust domain and the debug state of the trust domain, and an opcode to indicate the execution circuitry is to save the control state of the trust domain into the data structure from the control register and clear the control register, and store the debug state of the trust domain into the data structure from the debug register and clear the debug register; and the execution circuitry of the hardware processor core to execute the second decoded instruction according to the opcode.

Example 7. The apparatus of any one of examples 1-6, wherein the clear of the debug register comprises a store of a zero bit value and a non-zero bit value into the control register.

Example 8. The apparatus of any one of examples 1-7, wherein:

the decoder circuitry of the hardware processor core is to decode a second single instruction into a second decoded instruction, the second single instruction having a field to indicate a register, and an opcode to indicate the execution circuitry is to store a value into the register to identify the control state and the debug state that the first single instruction is to save into the data structure; and the execution circuitry of the hardware processor core to execute the second decoded instruction according to the opcode.

Example 9. A method comprising:

managing one or more hardware isolated virtual machines as a respective trust domain with a region of protected memory by a trust domain manager of a hardware processor core that also comprises a virtual machine monitor that is not allowed access to the region of protected memory of the one or more hardware isolated virtual machines;

decoding, by decoder circuitry of the hardware processor core, a first single instruction into a first decoded instruction, the first single instruction having a field to indicate a data structure to store a control state of a trust domain and a debug state of the trust domain, and an opcode to indicate execution circuitry is to load the control state of the trust domain from the data structure into a control register of the hardware processor core and load the debug state of the trust domain from the data structure into a debug register of the hardware processor core; and executing, by the execution circuitry of the hardware processor core, the first decoded instruction according to the opcode.

Example 10. The method of example 9, wherein the control state comprises a linear address that the trust domain attempted to access that caused a page fault.

Example 11. The method of any one of examples 9-10, wherein the debug state comprises a pointer to a debug save area to store branch records for the trust domain and processor event-based sampling records for the trust domain.

Example 12. The method of any one of examples 9-11, wherein the first single instruction further comprises a field to indicate the load of the control state of the trust domain from the data structure into the control register and the load the debug state of the trust domain from the data structure into the debug register are a first function of multiple selectable trust domain functions of the first single instruction.

Example 13. The method of any one of examples 9-12, wherein the field is to indicate a register to store a linear address of the data structure.

Example 14. The method of any one of examples 9-13, further comprising:

decoding, by the decoder circuitry of the hardware processor core, a second single instruction into a second decoded instruction, the second single instruction having a field to indicate a data structure to store the control state of the trust domain and the debug state of the trust domain, and an opcode to indicate the execution circuitry is to save the control state of the trust domain into the data structure from the control register and clear the control register, and store the debug state of the trust domain into the data structure from the debug register and clear the debug register; and executing, by the execution circuitry of the hardware processor core, the second decoded instruction according to the opcode.

Example 15. The method of any one of examples 9-14, wherein the clear of the debug register comprises a store of a zero bit value and a non-zero bit value into the control register.

Example 16. The method of any one of examples 9-15, further comprising:

decoding, by the decoder circuitry of the hardware processor core, a second single instruction into a second decoded instruction, the second single instruction having a field to indicate a register, and an opcode to indicate the execution circuitry is to store a value into the register to identify the control state and the debug state that the first single instruction is to save into the data structure; and executing, by the execution circuitry of the hardware processor core, the second decoded instruction according to the opcode.

Example 17. A non-transitory machine-readable medium that stores code that when executed by a machine, wherein the machine comprises a control register, a debug register, and is to implement a trust domain manager to manage one or more hardware isolated virtual machines as a respective trust domain with a region of protected memory, and a virtual machine monitor that is not allowed access to the region of protected memory of the one or more hardware isolated virtual machines, causes the machine to perform a method comprising:

decoding, by decoder circuitry, a first single instruction into a first decoded instruction, the first single instruction having a field to indicate a data structure to store a control state of a trust domain and a debug state of the trust domain, and an opcode to indicate execution circuitry is to load the control state of the trust domain from the data structure into the control register and load the debug state of the trust domain from the data structure into the debug register; and executing, by the execution circuitry, the first decoded instruction according to the opcode.

Example 18. The non-transitory machine-readable medium of example 17, wherein the control state comprises a linear address that the trust domain attempted to access that caused a page fault.

Example 19. The non-transitory machine-readable medium of any one of examples 17-18, wherein the debug state comprises a pointer to a debug save area to store branch records for the trust domain and processor event-based sampling records for the trust domain.

Example 20. The non-transitory machine-readable medium of any one of examples 17-19, wherein the first single instruction further comprises a field to indicate the load of the control state of the trust domain from the data structure into the control register and the load the debug state of the trust domain from the data structure into the debug register are a first function of multiple selectable trust domain functions of the first single instruction.

Example 21. The non-transitory machine-readable medium of any one of examples 17-20, wherein the field is to indicate a register to store a linear address of the data structure.

Example 22. The non-transitory machine-readable medium of any one of examples 17-21, wherein the method further comprises:

decoding, by the decoder circuitry, a second single instruction into a second decoded instruction, the second single instruction having a field to indicate a data structure to store the control state of the trust domain and the debug state of the trust domain, and an opcode to indicate the execution circuitry is to save the control state of the trust domain into the data structure from the control register and clear the control register, and store the debug state of the trust domain into the data structure from the debug register and clear the debug register; and executing, by the execution circuitry, the second decoded instruction according to the opcode.

Example 23. The non-transitory machine-readable medium of any one of examples 17-22, wherein the clear of the debug register comprises a store of a zero bit value and a non-zero bit value into the control register.

Example 24. The non-transitory machine-readable medium of any one of examples 17-23, wherein the method further comprises:

decoding, by the decoder circuitry, a second single instruction into a second decoded instruction, the second single instruction having a field to indicate a register, and an opcode to indicate the execution circuitry is to store a value into the register to identify the control state and the debug state that the first single instruction is to save into the data structure; and executing, by the execution circuitry, the second decoded instruction according to the opcode.

Example Computer Architectures.

Detailed below are descriptions of example computer architectures. Other system designs and configurations known in the arts for laptop, desktop, and handheld personal computers (PC)s, personal digital assistants, engineering workstations, servers, disaggregated servers, network devices, network hubs, switches, routers, embedded processors, digital signal processors (DSPs), graphics devices, video game devices, set-top boxes, micro controllers, cell phones, portable media players, hand-held devices, and various other electronic devices, are also suitable. In general, a variety of systems or electronic devices capable of incorporating a processor and/or other execution logic as disclosed herein are generally suitable.

Figure 11:
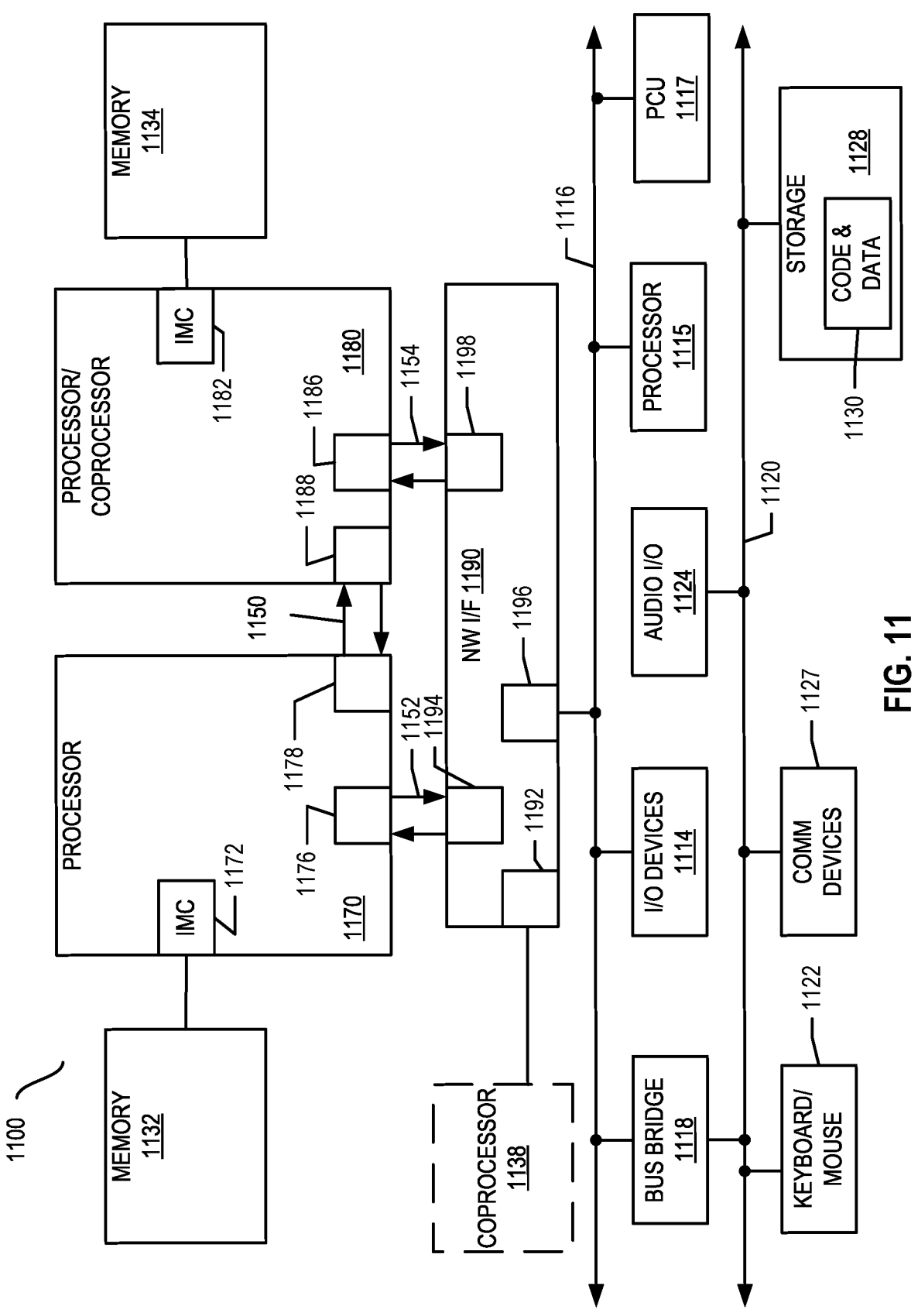
FIG. 11 illustrates an example computing system.

FIG. 11 illustrates an example computing system. Multi-processor system 1100 is an interfaced system and includes a plurality of processors or cores including a first processor 1170 and a second processor 1180 coupled via an interface 1150 such as a point-to-point (P-P) interconnect, a fabric, and/or bus. In some examples, the first processor 1170 and the second processor 1180 are homogeneous. In some examples, first processor 1170 and the second processor 1180 are heterogenous. Though the example system 1100 is shown to have two processors, the system may have three or more processors, or may be a single processor system. In some examples, the computing system is a system on a chip (SoC).

Processors 1170 and 1180 are shown including integrated memory controller (IMC) circuitry 1172 and 1182, respectively. Processor 1170 also includes interface circuits 1176 and 1178; similarly, second processor 1180 includes interface circuits 1186 and 1188. Processors 1170, 1180 may exchange information via the interface 1150 using interface circuits 1178, 1188. IMCs 1172 and 1182 couple the processors 1170, 1180 to respective memories, namely a memory 1132 and a memory 1134, which may be portions of main memory locally attached to the respective processors.

Processors 1170, 1180 may each exchange information with a network interface (NW I/F) 1190 via individual interfaces 1152, 1154 using interface circuits 1176, 1194, 1186, 1198. The network interface 1190 (e.g., one or more of an interconnect, bus, and/or fabric, and in some examples is a chipset) may optionally exchange information with a coprocessor 1138 via an interface circuit 1192. In some examples, the coprocessor 1138 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 1170, 1180 or outside of both processors, yet connected with the processors via an interface such as P-P interconnect, such that either or both processors' local cache information may be stored in the shared cache if a processor is placed into a low power mode.

Network interface 1190 may be coupled to a first interface 1116 via interface circuit 1196. In some examples, first interface 1116 may be an interface such as a Peripheral Component Interconnect (PCI) interconnect, a PCI Express interconnect or another I/O interconnect. In some examples, first interface 1116 is coupled to a power control unit (PCU) 1117, which may include circuitry, software, and/or firmware to perform power management operations with regard to the processors 1170, 1180 and/or co-processor 1138. PCU 1117 provides control information to a voltage regulator (not shown) to cause the voltage regulator to generate the appropriate regulated voltage. PCU 1117 also provides control information to control the operating voltage generated. In various examples, PCU 1117 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 1117 is illustrated as being present as logic separate from the processor 1170 and/or processor 1180. In other cases, PCU 1117 may execute on a given one or more of cores (not shown) of processor 1170 or 1180. In some cases, PCU 1117 may be implemented as a microcontroller (dedicated or general-purpose) or other control logic configured to execute its own dedicated power management code, sometimes referred to as P-code. In yet other examples, power management operations to be performed by PCU 1117 may be implemented externally to a processor, such as by way of a separate power management integrated circuit (PMIC) or another component external to the processor. In yet other examples, power management operations to be performed by PCU 1117 may be implemented within BIOS or other system software.

Various I/O devices 1114 may be coupled to first interface 1116, along with a bus bridge 1118 which couples first interface 1116 to a second interface 1120. In some examples, one or more additional processor(s) 1115, such as coprocessors, high throughput many integrated core (MIC) processors, GPGPUs, accelerators (such as graphics accelerators or digital signal processing (DSP) units), field programmable gate arrays (FPGAs), or any other processor, are coupled to first interface 1116. In some examples, second interface 1120 may be a low pin count (LPC) interface. Various devices may be coupled to second interface 1120 including, for example, a keyboard and/or mouse 1122, communication devices 1127 and storage circuitry 1128. Storage circuitry 1128 may be one or more non-transitory machine-readable storage media as described below, such as a disk drive or other mass storage device which may include instructions/ code and data 1130 and may implement the storage 1103 in some examples. Further, an audio I/O 1124 may be coupled to second interface 1120. Note that other architectures than the point-to-point architecture described above are possible. For example, instead of the point-to-point architecture, a system such as multiprocessor system 1100 may implement a multi-drop interface or other such architecture.

Example Core Architectures, Processors, and Computer Architectures.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may be included on the same die as the described CPU (sometimes referred to as the application core(s) or application processor(s)), the above described coprocessor, and additional functionality. Example core architectures are described next, followed by descriptions of example processors and computer architectures.

Figure 12:
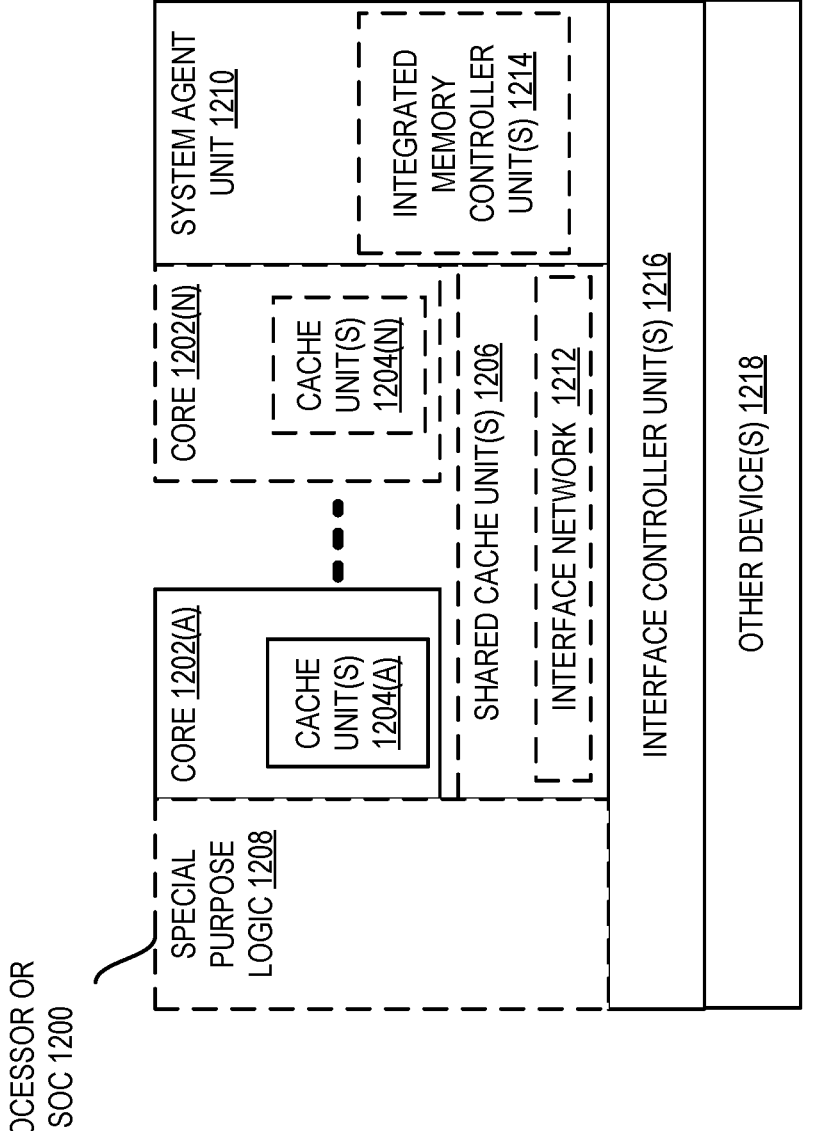
FIG. 12 illustrates a block diagram of an example processor and/or System on a Chip (SoC) that may have one or more cores and an integrated memory controller.

FIG. 12 illustrates a block diagram of an example processor and/or SoC 1200 that may have one or more cores and an integrated memory controller. The solid lined boxes illustrate a processor 1200 with a single core 1202(A), system agent unit circuitry 1210, and a set of one or more interface controller unit(s) circuitry 1216, while the optional addition of the dashed lined boxes illustrates an alternative processor 1200 with multiple cores 1202(A)-(N), a set of one or more integrated memory controller unit(s) circuitry 1214 in the system agent unit circuitry 1210, and special purpose logic 1208, as well as a set of one or more interface controller units circuitry 1216. Note that the processor 1200 may be one of the processors 1170 or 1180, or co-processor 1138 or 1115 of FIG. 11.

Thus, different implementations of the processor 1200 may include: 1) a CPU with the special purpose logic 1208 being integrated graphics and/or scientific (throughput) logic (which may include one or more cores, not shown), and the cores 1202(A)-(N) being one or more general purpose cores (e.g., general purpose in-order cores, general purpose out-of-order cores, or a combination of the two); 2) a coprocessor with the cores 1202(A)-(N) being a large number of special purpose cores intended primarily for graphics and/or scientific (throughput); and 3) a coprocessor with the cores 1202(A)-(N) being a large number of general purpose in-order cores. Thus, the processor 1200 may be a general-purpose processor, coprocessor, or special-purpose processor, such as, for example, a network or communication processor, compression engine, graphics processor, GPGPU (general purpose graphics processing unit), a high throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 1204(A)-(N) within the cores 1202(A)-(N), a set of one or more shared cache unit(s) circuitry 1206, and external memory (not shown) coupled to the set of integrated memory controller unit(s) circuitry 1214. The set of one or more shared cache unit(s) circuitry 1206 may include one or more mid-level caches, such as level 2 (L2), level 3 (L3), level 4 (L4), or other levels of cache, such as a last level cache (LLC), and/or combinations thereof. While in some examples interface network circuitry 1212 (e.g., a ring interconnect) interfaces the special purpose logic 1208 (e.g., integrated graphics logic), the set of shared cache unit(s) circuitry 1206, and the system agent unit circuitry 1210, alternative examples use any number of well-known techniques for interfacing such units. In some examples, coherency is maintained between one or more of the shared cache unit(s) circuitry 1206 and cores 1202(A)-(N). In some examples, interface controller units circuitry 1216 couple the cores 1202 to one or more other devices 1218 such as one or more I/O devices, storage, one or more communication devices (e.g., wireless networking, wired networking, etc.), etc.

In some examples, one or more of the cores 1202(A)-(N) are capable of multi-threading. The system agent unit circuitry 1210 includes those components coordinating and operating cores 1202(A)-(N). The system agent unit circuitry 1210 may include, for example, power control unit (PCU) circuitry and/or display unit circuitry (not shown). The PCU may be or may include logic and components needed for regulating the power state of the cores 1202(A)-(N) and/or the special purpose logic 1208 (e.g., integrated graphics logic). The display unit circuitry is for driving one or more externally connected displays.

The cores 1202(A)-(N) may be homogenous in terms of instruction set architecture (ISA). Alternatively, the cores 1202(A)-(N) may be heterogeneous in terms of ISA; that is, a subset of the cores 1202(A)-(N) may be capable of executing an ISA, while other cores may be capable of executing only a subset of that ISA or another ISA.

Example Core Architectures—In-order and out-of-order core block diagram.

Figure 13A:
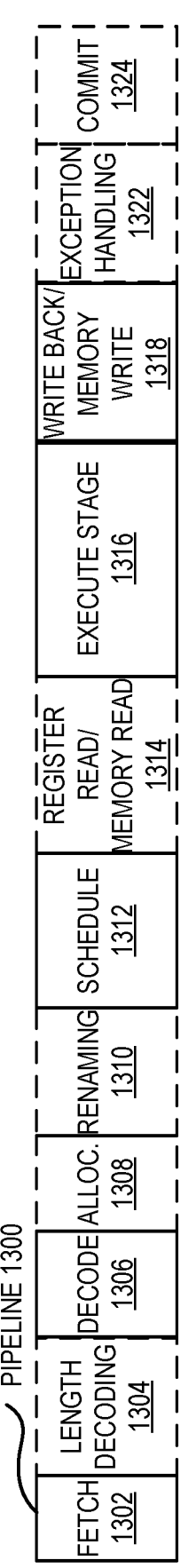
FIG. 13A is a block diagram illustrating both an example in-order pipeline and an example register renaming, out-of-order issue/execution pipeline according to examples.
Figure 13B:
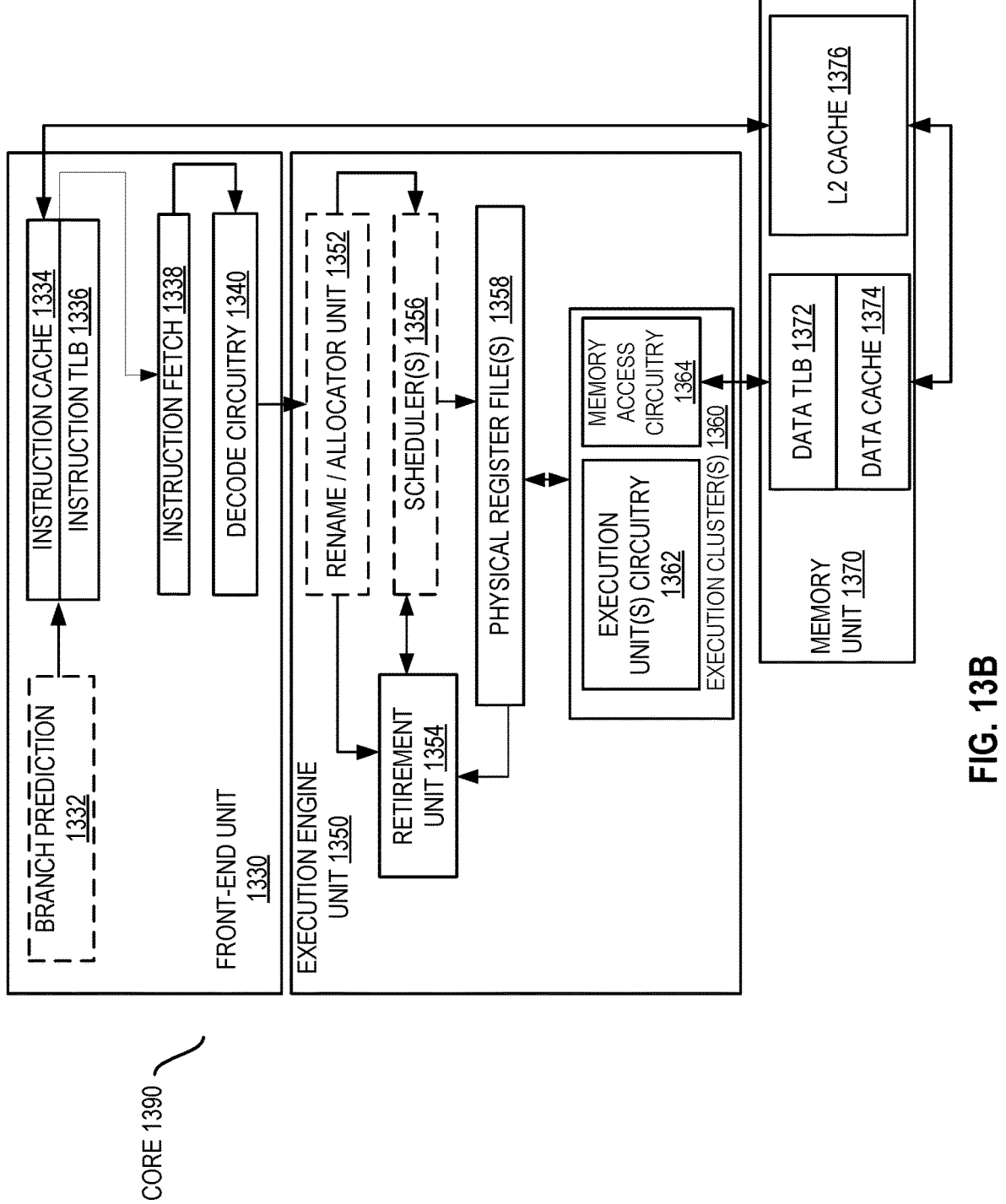
FIG. 13B is a block diagram illustrating both an example in-order architecture core and an example register renaming, out-of-order issue/execution architecture core to be included in a processor according to examples.

FIG. 13A is a block diagram illustrating both an example in-order pipeline and an example register renaming, out-of-order issue/execution pipeline according to examples. FIG.

13B is a block diagram illustrating both an example in-order architecture core and an example register renaming, out-of-order issue/execution architecture core to be included in a processor according to examples. The solid lined boxes in FIGS. 13A-13B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 13A, a processor pipeline 1300 includes a fetch stage 1302, an optional length decoding stage 1304, a decode stage 1306, an optional allocation (Alloc) stage 1308, an optional renaming stage 1310, a schedule (also known as a dispatch or issue) stage 1312, an optional register read/memory read stage 1314, an execute stage 1316, a write back/memory write stage 1318, an optional exception handling stage 1322, and an optional commit stage 1324. One or more operations can be performed in each of these processor pipeline stages. For example, during the fetch stage 1302, one or more instructions are fetched from instruction memory, and during the decode stage 1306, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 1306 and the register read/memory read stage 1314 may be combined into one pipeline stage. In one example, during the execute stage 1316, the decoded instructions may be executed, LSU address/data pipelining to an Advanced Microcontroller Bus (AMB) interface may be performed, multiply and add operations may be performed, arithmetic operations with branch results may be performed, etc.

By way of example, the example register renaming, out-of-order issue/execution architecture core of FIG. 13B may implement the pipeline 1300 as follows: 1) the instruction fetch circuitry 1338 performs the fetch and length decoding stages 1302 and 1304; 2) the decode circuitry 1340 performs the decode stage 1306; 3) the rename/allocator unit circuitry 1352 performs the allocation stage 1308 and renaming stage 1310; 4) the scheduler(s) circuitry 1356 performs the schedule stage 1312; 5) the physical register file(s) circuitry 1358 and the memory unit circuitry 1370 perform the register read/memory read stage 1314; the execution cluster(s) 1360 perform the execute stage 1316; 6) the memory unit circuitry 1370 and the physical register file(s) circuitry 1358 perform the write back/memory write stage 1318; 7) various circuitry may be involved in the exception handling stage 1322; and 8) the retirement unit circuitry 1354 and the physical register file(s) circuitry 1358 perform the commit stage 1324.

FIG. 13B shows a processor core 1390 including front-end unit circuitry 1330 coupled to execution engine unit circuitry 1350, and both are coupled to memory unit circuitry 1370. The core 1390 may be a reduced instruction set architecture computing (RISC) core, a complex instruction set architecture computing (CISC) core, a very long instruction word (VLIW) core, or a hybrid or alternative core type. As yet another option, the core 1390 may be a special-purpose core, such as, for example, a network or communication core, compression engine, coprocessor core, general purpose computing graphics processing unit (GPGPU) core, graphics core, or the like.

The front-end unit circuitry 1330 may include branch prediction circuitry 1332 coupled to instruction cache circuitry 1334, which is coupled to an instruction translation lookaside buffer (TLB) 1336, which is coupled to instruction fetch circuitry 1338, which is coupled to decode circuitry 1340. In one example, the instruction cache circuitry 1334 is included in the memory unit circuitry 1370 rather than the front-end circuitry 1330. The decode circuitry 1340 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 1340 may further include address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 1340 may be implemented using various different mechanisms. Examples of suitable mechanisms include, but are not limited to, look-up tables, hardware implementations, programmable logic arrays (PLAs), microcode read only memories (ROMs), etc. In one example, the core 1390 includes a microcode ROM (not shown) or other medium that stores microcode for certain macroinstructions (e.g., in decode circuitry 1340 or otherwise within the front-end circuitry 1330). In one example, the decode circuitry 1340 includes a micro-operation (micro-op) or operation cache (not shown) to hold/cache decoded operations, micro-tags, or micro-operations generated during the decode or other stages of the processor pipeline 1300. The decode circuitry 1340 may be coupled to rename/allocator unit circuitry 1352 in the execution engine circuitry 1350.

The execution engine circuitry 1350 includes the rename/allocator unit circuitry 1352 coupled to retirement unit circuitry 1354 and a set of one or more scheduler(s) circuitry 1356. The scheduler(s) circuitry 1356 represents any number of different schedulers, including reservations stations, central instruction window, etc. In some examples, the scheduler(s) circuitry 1356 can include arithmetic logic unit (ALU) scheduler/scheduling circuitry, ALU queues, address generation unit (AGU) scheduler/scheduling circuitry, AGU queues, etc. The scheduler(s) circuitry 1356 is coupled to the physical register file(s) circuitry 1358. Each of the physical register file(s) circuitry 1358 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 1358 includes vector registers unit circuitry, writemask registers unit circuitry, and scalar register unit circuitry. These register units may provide architectural vector registers, vector mask registers, general-purpose registers, etc. The physical register file(s) circuitry 1358 is coupled to the retirement unit circuitry 1354 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1354 and the physical register file(s) circuitry 1358 are coupled to the execution cluster(s) 1360. The execution cluster(s) 1360 includes a set of one or more execution unit(s) circuitry 1362 and a set of one or more memory access circuitry 1364. The execution unit(s) circuitry 1362 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 1356, physical register file(s) circuitry 1358, and execution cluster(s) 1360 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 1364). It should also be understood that where separate pipelines are used, one or more of these pipelines may be out-of-order issue/execution and the rest in-order.

In some examples, the execution engine unit circuitry 1350 may perform load store unit (LSU) address/data pipelining to an Advanced Microcontroller Bus (AMB) interface (not shown), and address phase and writeback, data phase load, store, and branches.

The set of memory access circuitry 1364 is coupled to the memory unit circuitry 1370, which includes data TLB circuitry 1372 coupled to data cache circuitry 1374 coupled to level 2 (L2) cache circuitry 1376. In one example, the memory access circuitry 1364 may include load unit circuitry, store address unit circuitry, and store data unit circuitry, each of which is coupled to the data TLB circuitry 1372 in the memory unit circuitry 1370. The instruction cache circuitry 1334 is further coupled to the level 2 (L2) cache circuitry 1376 in the memory unit circuitry 1370. In one example, the instruction cache 1334 and the data cache 1374 are combined into a single instruction and data cache (not shown) in L2 cache circuitry 1376, level 3 (L3) cache circuitry (not shown), and/or main memory. The L2 cache circuitry 1376 is coupled to one or more other levels of cache and eventually to a main memory.

The core 1390 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In one example, the core 1390 includes logic to support a packed data instruction set architecture extension (e.g., AVX1, AVX2), thereby allowing the operations used by many multimedia applications to be performed using packed data.

Example Execution Unit(s) Circuitry.

Figure 14:
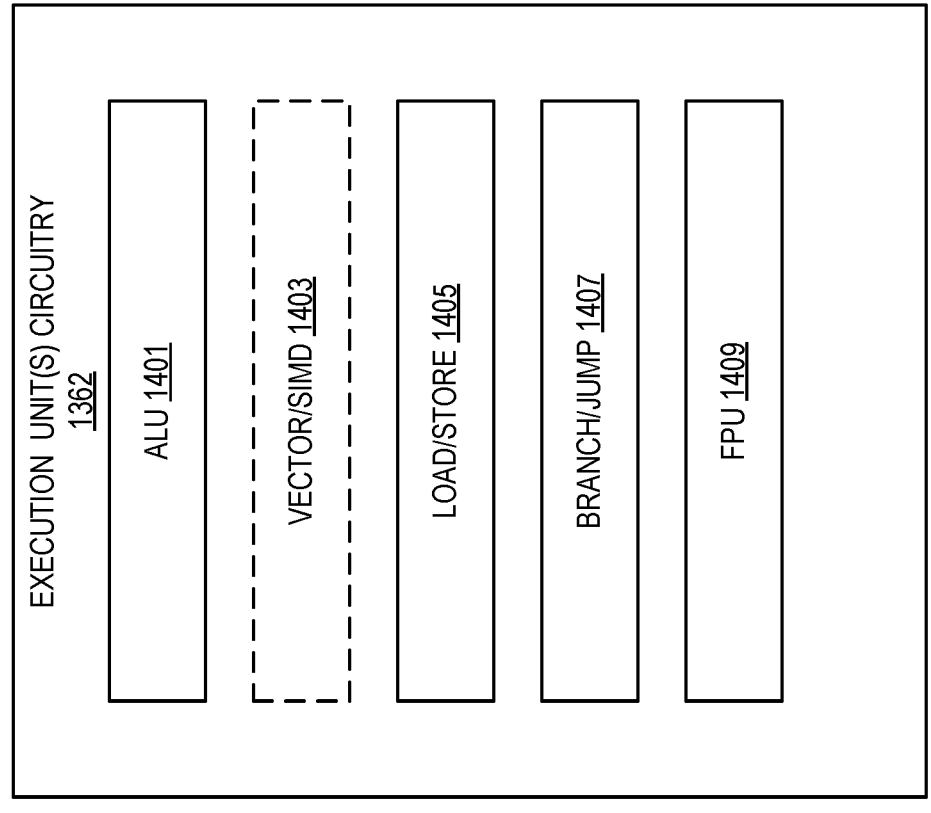
FIG. 14 illustrates examples of execution unit(s) circuitry.

FIG. 14 illustrates examples of execution unit(s) circuitry, such as execution unit(s) circuitry 1362 of FIG. 13B. As illustrated, execution unit(s) circuitry 1362 may include one or more ALU circuits 1401, optional vector/single instruction multiple data (SIMD) circuits 1403, load/store circuits 1405, branch/jump circuits 1407, and/or Floating-point unit (FPU) circuits 1409. ALU circuits 1401 perform integer arithmetic and/or Boolean operations. Vector/SIMD circuits 1403 perform vector/SIMD operations on packed data (such as SIMD/vector registers). Load/store circuits 1405 execute load and store instructions to load data from memory into registers or store from registers to memory. Load/store circuits 1405 may also generate addresses. Branch/jump circuits 1407 cause a branch or jump to a memory address depending on the instruction. FPU circuits 1409 perform floating-point arithmetic. The width of the execution unit(s) circuitry 1362 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

Example Register Architecture.

FIG. 15 is a block diagram of a register architecture 1500 according to some examples. As illustrated, the register architecture 1500 includes vector/SIMD registers 1510 that vary from 128-bit to 1,024 bits width. In some examples, the vector/SIMD registers 1510 are physically 512-bits and, depending upon the mapping, only some of the lower bits are used. For example, in some examples, the vector/SIMD registers 1510 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 1500 includes writemask/predicate registers 1515. For example, in some examples, there are 8 writemask/predicate registers (sometimes called k0 through k7) that are each 16-bit, 32-bit, 64-bit, or 128-bit in size. Writemask/predicate registers 1515 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 1515 corresponds to a data element position of the destination. In other examples, the writemask/predicate registers 1515 are scalable and consists of a set number of enable bits for a given vector element (e.g., 8 enable bits per 64-bit vector element).

The register architecture 1500 includes a plurality of general-purpose registers 1525. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 1500 includes scalar floating-point (FP) register file 1545 which is used for scalar floating-point operations on 32/64/80-bit floating-point data using the x87 instruction set architecture extension or as MMX registers to perform operations on 64-bit packed integer data, as well as to hold operands for some operations performed between the MMX and XMM registers.

One or more flag registers 1540 (e.g., EFLAGS, RFLAGS, etc.) store status and control information for arithmetic, compare, and system operations. For example, the one or more flag registers 1540 may store condition code information such as carry, parity, auxiliary carry, zero, sign, and overflow. In some examples, the one or more flag registers 1540 are called program status and control registers.

Segment registers 1520 contain segment points for use in accessing memory. In some examples, these registers are referenced by the names CS, DS, SS, ES, FS, and GS.

Machine specific registers (MSRs) 1535 control and report on processor performance. Most MSRs 1535 handle system-related functions and are not accessible to an application program. Machine check registers 1560 consist of control, status, and error reporting MSRs that are used to detect and report on hardware errors.

One or more instruction pointer register(s) 1530 store an instruction pointer value. Control register(s) 1555 (e.g., CR0-CR4) determine the operating mode of a processor (e.g., processor 1170, 1180, 1138, 1115, and/or 1200) and the characteristics of a currently executing task. Debug registers 1550 control and allow for the monitoring of a processor or core's debugging operations.

Memory (mem) management registers 1565 specify the locations of data structures used in protected mode memory management. These registers may include a global descriptor table register (GDTR), interrupt descriptor table register (IDTR), task register, and a local descriptor table register (LDTR) register.

Alternative examples may use wider or narrower registers. Additionally, alternative examples may use more, less, or different register files and registers. The register architecture 1500 may, for example, be used in register file/ memory 1108, or physical register file(s) circuitry 1358.

Instruction set architectures.

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down through the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an example ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. In addition, though the description below is made in the context of x86 ISA, it is within the knowledge of one skilled in the art to apply the teachings of the present disclosure in another ISA.

Example Instruction Formats.

Examples of the instruction(s) described herein may be embodied in different formats. Additionally, example systems, architectures, and pipelines are detailed below. Examples of the instruction(s) may be executed on such systems, architectures, and pipelines, but are not limited to those detailed.

Figure 16:
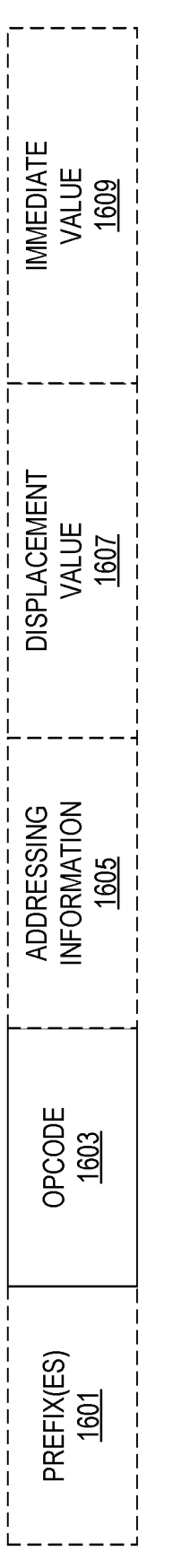
FIG. 16 illustrates examples of an instruction format.

FIG. 16 illustrates examples of an instruction format. As illustrated, an instruction may include multiple components including, but not limited to, one or more fields for: one or more prefixes 1601, an opcode 1603, addressing information 1605 (e.g., register identifiers, memory addressing information, etc.), a displacement value 1607, and/or an immediate value 1609. Note that some instructions utilize some or all the fields of the format whereas others may only use the field for the opcode 1603. In some examples, the order illustrated is the order in which these fields are to be encoded, however, it should be appreciated that in other examples these fields may be encoded in a different order, combined, etc.

The prefix(es) field(s) 1601, when used, modifies an instruction. In some examples, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 1603 is used to at least partially define the operation to be performed upon a decoding of the instruction. In some examples, a primary opcode encoded in the opcode field 1603 is one, two, or three bytes in length. In other examples, a primary opcode can be a different length. An additional 3-bit opcode field is sometimes encoded in another field.

Figure 17:
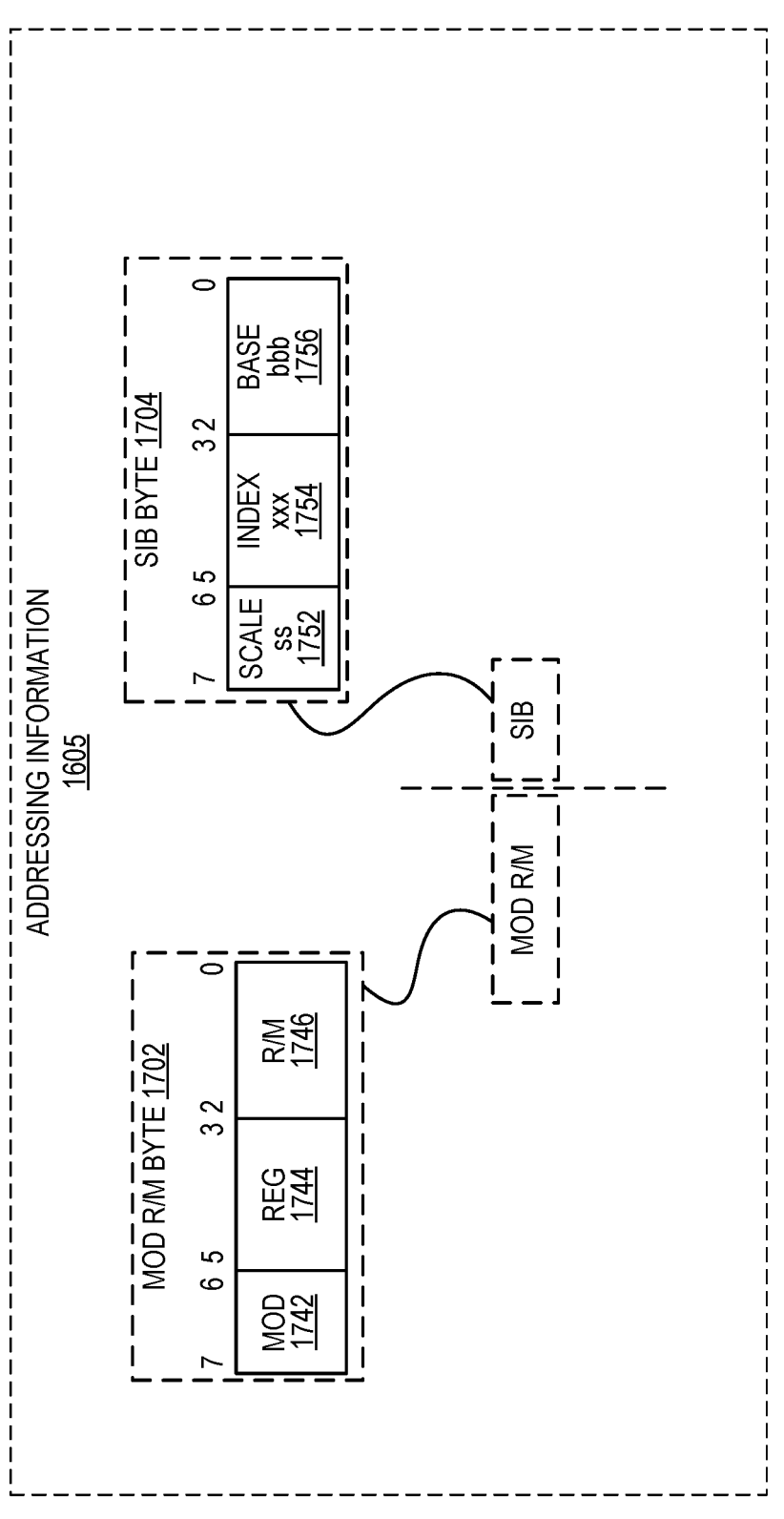
FIG. 17 illustrates examples of an addressing information field.

The addressing information field 1605 is used to address one or more operands of the instruction, such as a location in memory or one or more registers. FIG. 17 illustrates examples of the addressing information field 1605. In this illustration, an optional MOD R/M byte 1702 and an optional Scale, Index, Base (SIB) byte 1704 are shown. The MOD R/M byte 1702 and the SIB byte 1704 are used to encode up to two operands of an instruction, each of which is a direct register or effective memory address. Note that both of these fields are optional in that not all instructions include one or more of these fields. The MOD R/M byte 1702 includes a MOD field 1742, a register (reg) field 1744, and R/M field 1746.

The content of the MOD field 1742 distinguishes between memory access and non-memory access modes. In some examples, when the MOD field 1742 has a binary value of 11 (11b), a register-direct addressing mode is utilized, and otherwise a register-indirect addressing mode is used.

The register field 1744 may encode either the destination register operand or a source register operand or may encode an opcode extension and not be used to encode any instruction operand. The content of register field 1744, directly or through address generation, specifies the locations of a source or destination operand (either in a register or in memory). In some examples, the register field 1744 is supplemented with an additional bit from a prefix (e.g., prefix 1601) to allow for greater addressing.

The R/M field 1746 may be used to encode an instruction operand that references a memory address or may be used to encode either the destination register operand or a source register operand. Note the R/M field 1746 may be combined with the MOD field 1742 to dictate an addressing mode in some examples.

The SIB byte 1704 includes a scale field 1752, an index field 1754, and a base field 1756 to be used in the generation of an address. The scale field 1752 indicates a scaling factor. The index field 1754 specifies an index register to use. In some examples, the index field 1754 is supplemented with an additional bit from a prefix (e.g., prefix 1601) to allow for greater addressing. The base field 1756 specifies a base register to use. In some examples, the base field 1756 is supplemented with an additional bit from a prefix (e.g., prefix 1601) to allow for greater addressing. In practice, the content of the scale field 1752 allows for the scaling of the content of the index field 1754 for memory address generation (e.g., for address generation that uses $2^{scale}$*index+base).

Some addressing forms utilize a displacement value to generate a memory address. For example, a memory address may be generated according to $2^{scale}$*index+base+displacement, index*scale+displacement, r/m+displacement, instruction pointer (RIP/EIP)+displacement, register+displacement, etc. The displacement may be a 1-byte, 2-byte, 4-byte, etc. value. In some examples, the displacement field 1607 provides this value. Additionally, in some examples, a displacement factor usage is encoded in the MOD field of the addressing information field 1605 that indicates a compressed displacement scheme for which a displacement value is calculated and stored in the displacement field 1607.

In some examples, the immediate value field 1609 specifies an immediate value for the instruction. An immediate value may be encoded as a 1-byte value, a 2-byte value, a 4-byte value, etc.

Figures 18, 19A, 19B, 19C, 19D:
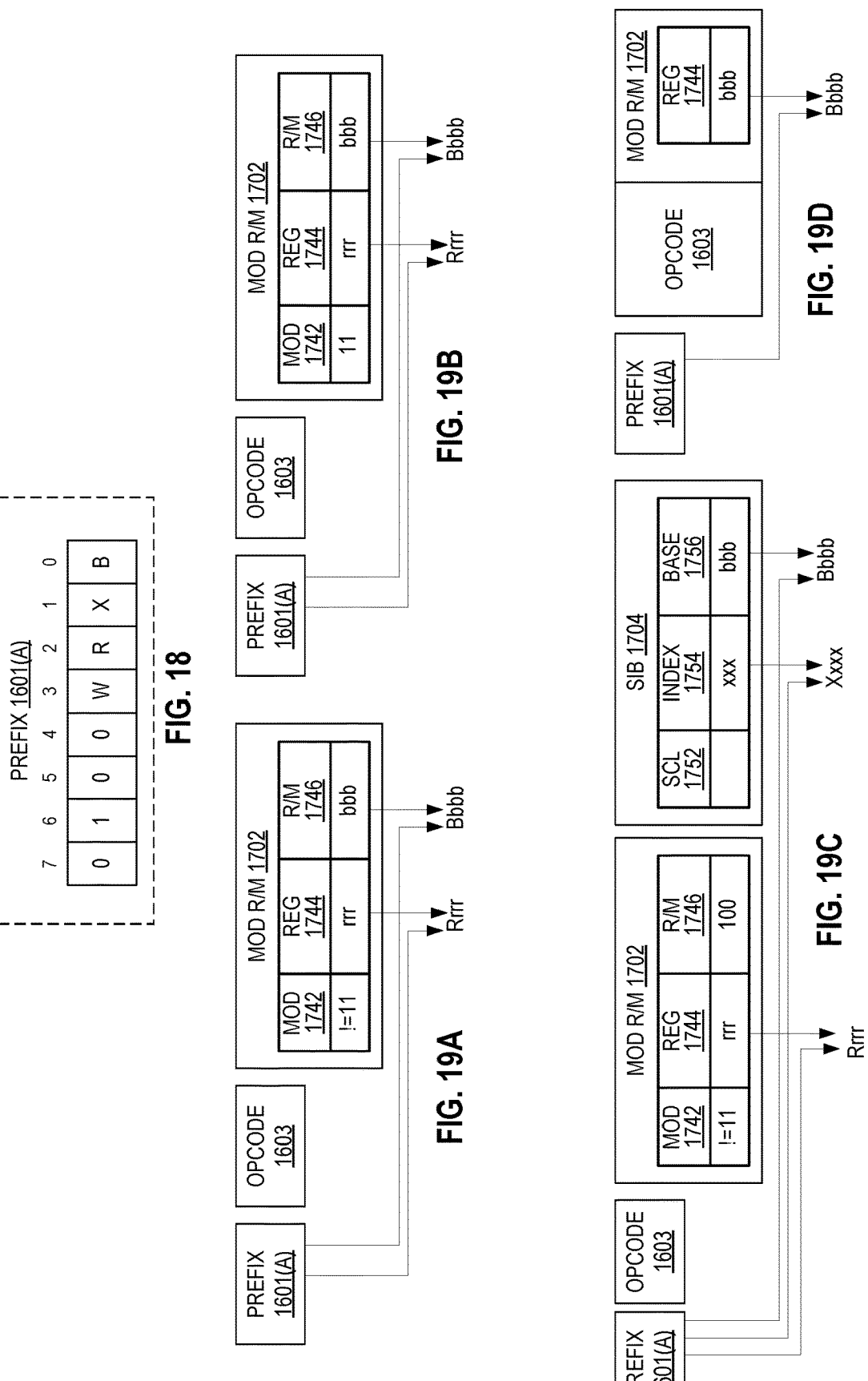
FIG. 18 illustrates examples of a first prefix.
FIGS. 19A-19D illustrate examples of how the R, X, and B fields of the first prefix in FIG. 18 are used.

FIG. 18 illustrates examples of a first prefix 1601(A). In some examples, the first prefix 1601(A) is an example of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 1601(A) may specify up to three registers using 3-bit fields depending on the format: 1) using the reg field 1744 and the R/M field 1746 of the MOD R/M byte 1702; 2) using the MOD R/M byte 1702 with the SIB byte 1704 including using the reg field 1744 and the base field 1756 and index field 1754; or 3) using the register field of an opcode.

In the first prefix 1601(A), bit positions 7:4 are set as 0100. Bit position 3 (W) can be used to determine the operand size but may not solely determine operand width. As such, when W=0, the operand size is determined by a code segment descriptor (CS.D) and when W=1, the operand size is 64-bit.

Note that the addition of another bit allows for 16 (24) registers to be addressed, whereas the MOD R/M reg field 1744 and MOD R/M R/M field 1746 alone can each only address 8 registers.

In the first prefix 1601(A), bit position 2 (R) may be an extension of the MOD R/M reg field 1744 and may be used to modify the MOD R/M reg field 1744 when that field encodes a general-purpose register, a 64-bit packed data register (e.g., an SSE register), or a control or debug register. R is ignored when MOD R/M byte 1702 specifies other registers or defines an extended opcode.

Bit position 1 (X) may modify the SIB byte index field 1754.

Bit position 0 (B) may modify the base in the MOD R/M R/M field 1746 or the SIB byte base field 1756; or it may modify the opcode register field used for accessing general purpose registers (e.g., general purpose registers 1525).

FIGS. 19A-19D illustrate examples of how the R, X, and B fields of the first prefix 1601(A) are used. FIG. 19A illustrates R and B from the first prefix 1601(A) being used to extend the reg field 1744 and R/M field 1746 of the MOD R/M byte 1702 when the SIB byte 17 04 is not used for memory addressing. FIG. 19B illustrates R and B from the first prefix 1601(A) being used to extend the reg field 1744 and R/M field 1746 of the MOD R/M byte 1702 when the SIB byte 17 04 is not used (register-register addressing). FIG. 19C illustrates R. X, and B from the first prefix 1601(A) being used to extend the reg field 1744 of the MOD R/M byte 1702 and the index field 1754 and base field 1756 when the SIB byte 17 04 being used for memory addressing. FIG. 19D illustrates B from the first prefix 1601(A) being used to extend the reg field 1744 of the MOD R/M byte 1702 when a register is encoded in the opcode 1603.

Figures 20A, 20B:
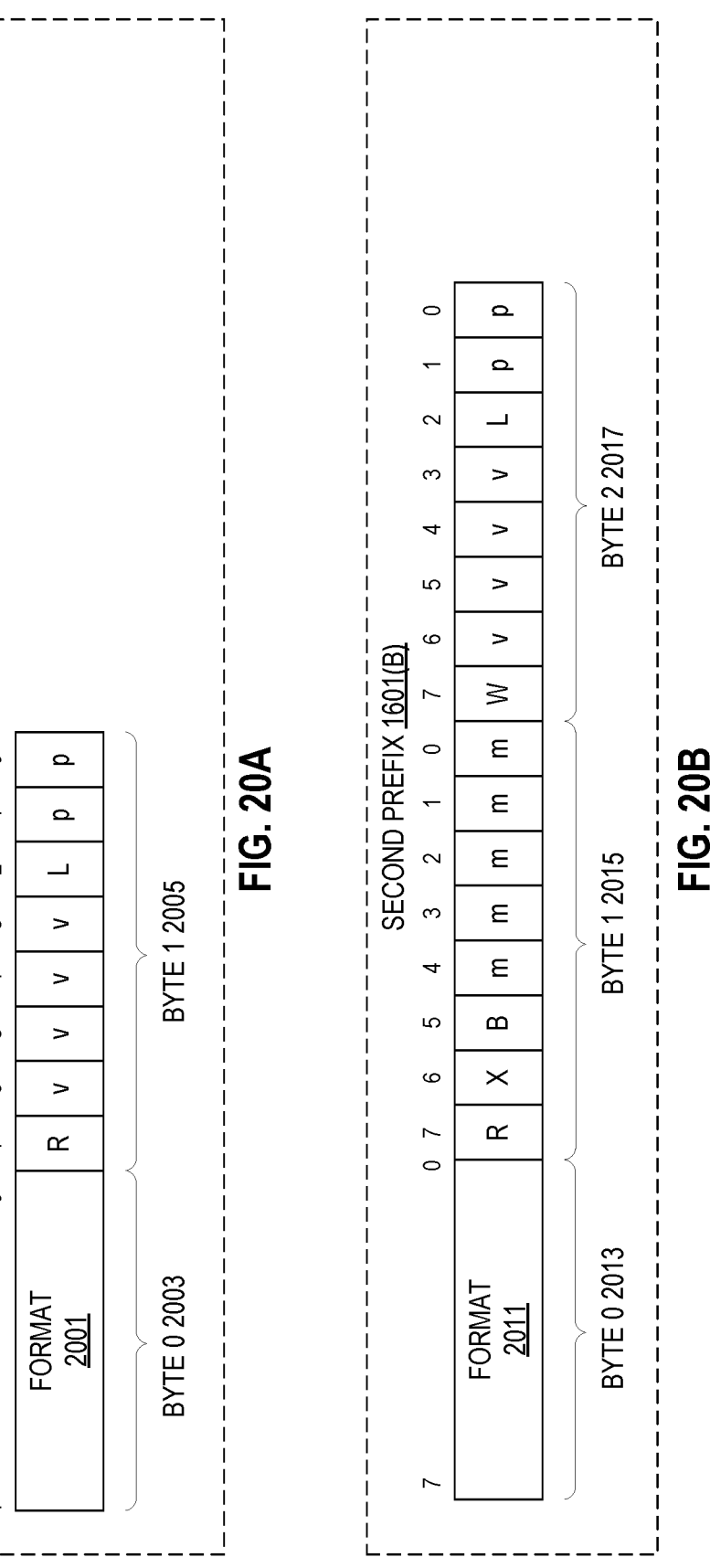
FIGS. 20A-20B illustrate examples of a second prefix.

FIGS. 20A-20B illustrate examples of a second prefix 1601(B). In some examples, the second prefix 1601(B) is an example of a VEX prefix. The second prefix 1601(B) encoding allows instructions to have more than two operands, and allows SIMD vector registers (e.g., vector/SIMD registers 1510) to be longer than 64-bits (e.g., 128-bit and 256-bit). The use of the second prefix 1601(B) provides for three-operand (or more) syntax. For example, previous two-operand instructions performed operations such as A=A+B, which overwrites a source operand. The use of the second prefix 1601(B) enables operands to perform nondestructive operations such as A=B+C.

In some examples, the second prefix 1601(B) comes in two forms—a two-byte form and a three-byte form. The two-byte second prefix 1601(B) is used mainly for 128-bit, scalar, and some 256-bit instructions; while the three-byte second prefix 1601(B) provides a compact replacement of the first prefix 1601(A) and 3-byte opcode instructions.

FIG. 20A illustrates examples of a two-byte form of the second prefix 1601(B). In one example, a format field 2001 (byte 0 2003) contains the value C5H. In one example, byte 1 2005 includes an "R" value in bit[7]. This value is the complement of the "R" value of the first prefix 1601(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the MOD R/M R/M field 1746 to encode the instruction operand that references a memory address or encode either the destination register operand or a source register operand.

Instructions that use this prefix may use the MOD R/M reg field 1744 to encode either the destination register operand or a source register operand, or to be treated as an opcode extension and not used to encode any instruction operand.

For instruction syntax that support four operands, vvvv, the MOD R/M R/M field 1746 and the MOD R/M reg field 1744 encode three of the four operands. Bits[7:4] of the immediate value field 1609 are then used to encode the third source register operand.

FIG. 20B illustrates examples of a three-byte form of the second prefix 1601(B). In one example, a format field 2011 (byte 0 2013) contains the value C4H. Byte 1 2015 includes in bits[7:5] "R," "X," and "B" which are the complements of the same values of the first prefix 1601(A). Bits[4:0] of byte 1 2015 (shown as mmmmm) include content to encode, as need, one or more implied leading opcode bytes. For example, 00001 implies a 0FH leading opcode, 00010 implies a 0F38H leading opcode, 00011 implies a 0F3AH leading opcode, etc.

Bit[7] of byte 2 2017 is used similar to W of the first prefix 1601(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix. 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the MOD R/M R/M field 1746 to encode the instruction operand that references a memory address or encode either the destination register operand or a source register operand.

Instructions that use this prefix may use the MOD R/M reg field 1744 to encode either the destination register operand or a source register operand, or to be treated as an opcode extension and not used to encode any instruction operand.

For instruction syntax that support four operands, vvvv, the MOD R/M R/M field 1746, and the MOD R/M reg field 1744 encode three of the four operands. Bits[7:4] of the immediate value field 1609 are then used to encode the third source register operand.

Figure 21:
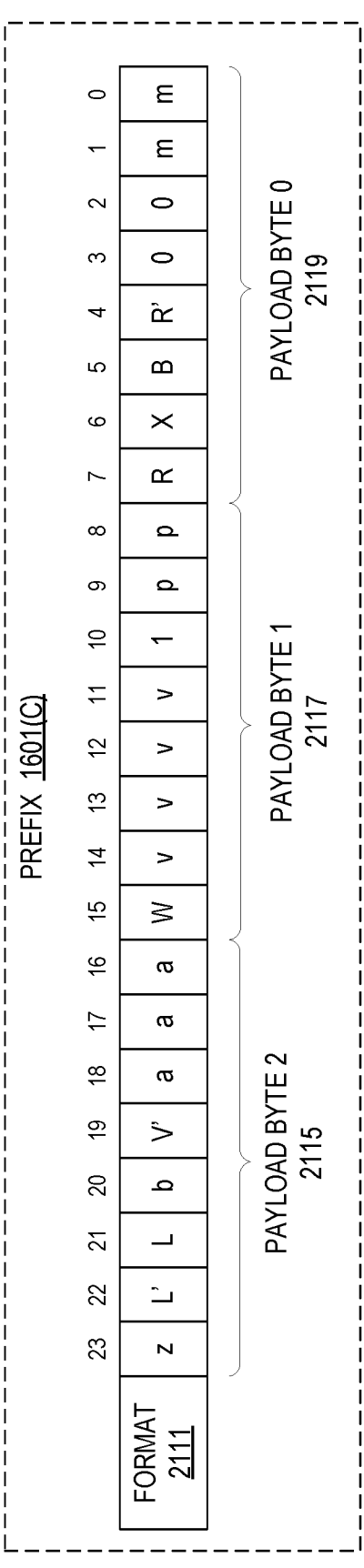
FIG. 21 illustrates examples of a third prefix.

FIG. 21 illustrates examples of a third prefix 1601(C). In some examples, the third prefix 1601(C) is an example of an EVEX prefix. The third prefix 1601(C) is a four-byte prefix.

The third prefix 1601(C) can encode 32 vector registers (e.g., 128-bit, 256-bit, and 512-bit registers) in 64-bit mode. In some examples, instructions that utilize a writemask/opmask (see discussion of registers in a previous figure, such as FIG. 15) or predication utilize this prefix. Opmask register allow for conditional processing or selection control. Opmask instructions, whose source/destination operands are opmask registers and treat the content of an opmask register as a single value, are encoded using the second prefix 1601(B).

The third prefix 1601(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 1601(C) is a format field 2111 that has a value, in one example, of 62H. Subsequent bytes are referred to as payload bytes 2115-2119 and collectively form a 24-bit value of P[23:0] providing specific capability in the form of one or more fields (detailed herein).

In some examples, P[1:0] of payload byte 2119 are identical to the low two mm bits. P[3:2] are reserved in some examples. Bit P[4] (R') allows access to the high 16 vector register set when combined with P[7] and the MOD R/M reg field 1744. P[6] can also provide access to a high 16 vector register when SIB-type addressing is not needed. P[7:5] consist of R. X, and B which are operand specifier modifier bits for vector register, general purpose register, memory addressing and allow access to the next set of 8 registers beyond the low 8 registers when combined with the MOD R/M register field 1744 and MOD R/M R/M field 1746. P[9:8] provide opcode extensionality equivalent to some legacy prefixes (e.g., 00=no prefix, 01=66H, 10=F3H, and 11=F2H). P[10] in some examples is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

P[15] is similar to W of the first prefix 1601(A) and second prefix 1611(B) and may serve as an opcode extension bit or operand size promotion.

P[18:16] specify the index of a register in the opmask (writemask) registers (e.g., writemask/predicate registers 1515). In one example, the specific value aaa=000 has a special behavior implying no opmask is used for the particular instruction (this may be implemented in a variety of ways including the use of an opmask hardwired to all ones or hardware that bypasses the masking hardware). When merging, vector masks allow any set of elements in the destination to be protected from updates during the execution of any operation (specified by the base operation and the augmentation operation); in other one example, preserving the old value of each element of the destination where the corresponding mask bit has a 0. In contrast, when zeroing vector masks allow any set of elements in the destination to be zeroed during the execution of any operation (specified by the base operation and the augmentation operation); in one example, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While examples are described in which the opmask field's content selects one of a number of opmask registers that contains the opmask to be used (and thus the opmask field's content indirectly identifies that masking to be performed), alternative examples instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Example examples of encoding of registers in instructions using the third prefix 1601(C) are detailed in the following tables.

TABLE 1

| 32-Register Support in 64-bit Mode | | | | |
|---|---|---|---|---|
| | 4 | 3 | [2:0] | REG. TYPE | COMMON USAGES |
| REG | R' | R | MOD R/M reg | GPR, Vector | Destination or Source |
| VVVV | V' | | vvvv | GPR, Vector | 2nd Source or Destination |

TABLE 1-continued

| 32-Register Support in 64-bit Mode | | | | | |
|---|---|---|---|---|---|
| | 4 | 3 | [2:0] | REG. TYPE | COMMON USAGES |
| RM | X | B | MOD R/M R/M | GPR, Vector | 1st Source or Destination |
| BASE | 0 | B | MOD R/M R/M | GPR | Memory addressing |
| INDEX | 0 | X | SIB.index | GPR | Memory addressing |
| VIDX | V' | X | SIB.index | Vector | VSIB memory addressing |

TABLE 2

| Encoding Register Specifiers in 32-bit Mode | | | |
|---|---|---|---|
| | [2:0] | REG. TYPE | COMMON USAGES |
| REG | MOD R/M reg | GPR, Vector | Destination or Source |
| VVVV | vvvv | GPR, Vector | $2^{nd}$ Source or Destination |
| RM | MOD R/M R/M | GPR, Vector | $1^{st}$ Source or Destination |
| BASE | MOD R/M R/M | GPR | Memory addressing |
| INDEX | SIB.index | GPR | Memory addressing |
| VIDX | SIB.index | Vector | VSIB memory addressing |

TABLE 3

| Opmask Register Specifier Encoding | | | |
|---|---|---|---|
| | [2:0] | REG. TYPE | COMMON USAGES |
| REG | MOD R/M Reg | k0-k7 | Source |
| VVVV | vvvv | k0-k7 | $2^{nd}$ Source |
| RM | MOD R/M R/M | k0-k7 | $1^{st}$ Source |
| {k1} | aaa | k0-k7 | Opmask |

Program code may be applied to input information to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), a field programmable gate array (FPGA), a microprocessor, or any combination thereof.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Examples of the mechanisms disclosed herein may be implemented in hardware, software, firmware, or a combination of such implementation approaches. Examples may be implemented as computer programs or program code executing on programmable systems comprising at least one processor, a storage system (including volatile and non-volatile memory and/or storage elements), at least one input device, and at least one output device.

One or more aspects of at least one example may be implemented by representative instructions stored on a machine-readable medium which represents various logic within the processor, which when read by a machine causes the machine to fabricate logic to perform the techniques described herein. Such representations, known as "intellectual property (IP) cores" may be stored on a tangible, machine readable medium and supplied to various customers or manufacturing facilities to load into the fabrication machines that make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples also include non-transitory, tangible machine-readable media containing instructions or containing design data, such as Hardware Description Language (HDL), which defines structures, circuits, apparatuses, processors and/or system features described herein. Such examples may also be referred to as program products.

Emulation (including binary translation, code morphing, etc.).

In some cases, an instruction converter may be used to convert an instruction from a source instruction set architecture to a target instruction set architecture. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 22 is a block diagram illustrating the use of a software instruction converter to convert binary instructions in a source ISA to binary instructions in a target ISA according to examples. In the illustrated example, the instruction converter is a software instruction converter, although alternatively the instruction converter may be implemented in software, firmware, hardware, or various combinations thereof. FIG. 22 shows a program in a high-level language 2202 may be compiled using a first ISA compiler 2204 to generate first ISA binary code 2206 that may be natively executed by a processor with at least one first ISA core 2216. The processor with at least one first ISA core 2216 represents any processor that can perform substantially the same functions as an Intel® processor with at least one first ISA core by compatibly executing or otherwise processing (1) a substantial portion of the first ISA or (2) object code versions of applications or other software targeted to run on an Intel processor with at least one first ISA core, in order to achieve substantially the same result as a processor with at least one first ISA core. The first ISA compiler 2204 represents a compiler that is operable to generate first ISA binary code 2206 (e.g., object code) that can, with or without additional linkage processing, be executed on the processor with at least one first ISA core 2216. Similarly, FIG. 22 shows the program in the high-level language 2202 may be compiled using an alternative ISA compiler 2208 to generate alternative ISA binary code 2210 that may be natively executed by a processor without a first ISA core 2214. The instruction converter 2212 is used to convert the first ISA binary code 2206 into code that may be natively executed by the processor without a first ISA core 2214. This converted code is not necessarily to be the same as the alternative ISA binary code 2210; however, the converted code will accomplish the general operation and be made up of instructions from the alternative ISA. Thus, the instruction converter 2212 represents software, firmware, hardware, or a combination thereof that, through emulation, simulation, or any other process, allows a processor or other electronic device that does not have a first ISA processor or core to execute the first ISA binary code 2206.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" or "A, B, and/or C" is intended to be understood to mean either A, B, or C, or any combination thereof (i.e. A and B, A and C, B and C, and A, B and C).

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A method comprising:
managing one or more hardware isolated virtual machines as a respective trust domain with a region of protected memory by a trust domain manager of a hardware processor core that also comprises a virtual machine monitor that is not allowed access to the region of protected memory of the one or more hardware isolated virtual machines;
decoding, by decoder circuitry of the hardware processor core, a first single instruction into a first decoded instruction, the first single instruction having a field to indicate a data structure to store a control state of a trust domain and a debug state of the trust domain, and an opcode to indicate execution circuitry is to load the control state of the trust domain from the data structure into a control register of the hardware processor core and load the debug state of the trust domain from the data structure into a debug register of the hardware processor core; and
executing, by the execution circuitry of the hardware processor core, the first decoded instruction according to the opcode.

2. The method of claim 1, wherein the control state comprises a linear address that the trust domain attempted to access that caused a page fault.

3. The method of claim 1, wherein the debug state comprises a pointer to a debug save area to store branch records for the trust domain and processor event-based sampling records for the trust domain.

4. The method of claim 1, wherein the first single instruction further comprises a field to indicate the load of the control state of the trust domain from the data structure into the control register and the load the debug state of the trust domain from the data structure into the debug register are a first function of multiple selectable trust domain functions of the first single instruction.

5. The method of claim 1, wherein the field is to indicate a register to store a linear address of the data structure.

6. The method of claim 1, further comprising:
decoding, by the decoder circuitry of the hardware processor core, a second single instruction into a second decoded instruction, the second single instruction having a field to indicate a data structure to store the control state of the trust domain and the debug state of the trust domain, and an opcode to indicate the execution circuitry is to save the control state of the trust domain into the data structure from the control register and clear the control register, and store the debug state of the trust domain into the data structure from the debug register and clear the debug register; and
executing, by the execution circuitry of the hardware processor core, the second decoded instruction according to the opcode.

7. The method of claim 1, wherein the clear of the debug register comprises a store of a zero bit value and a non-zero bit value into the control register.

8. The method of claim 1, further comprising:
decoding, by the decoder circuitry of the hardware processor core, a second single instruction into a second decoded instruction, the second single instruction having a field to indicate a register, and an opcode to indicate the execution circuitry is to store a value into the register to identify the control state and the debug state that the first single instruction is to save into the data structure; and
executing, by the execution circuitry of the hardware processor core, the second decoded instruction according to the opcode.

9. An apparatus comprising:
a hardware processor core to implement a trust domain manager to manage one or more hardware isolated virtual machines as a respective trust domain with a region of protected memory, and a virtual machine monitor that is not allowed access to the region of protected memory of the one or more hardware isolated virtual machines;
a debug register of the hardware processor core;
a control register of the hardware processor core;
decoder circuitry of the hardware processor core to decode a first single instruction into a first decoded instruction, the first single instruction having a field to indicate a data structure to store a control state of a trust domain and a debug state of the trust domain, and an opcode to indicate execution circuitry is to load the control state of the trust domain from the data structure into the control register and load the debug state of the trust domain from the data structure into the debug register; and
the execution circuitry of the hardware processor core to execute the first decoded instruction according to the opcode.

10. The apparatus of claim 9, wherein the control state comprises a linear address that the trust domain attempted to access that caused a page fault.

11. The apparatus of claim 9, wherein the debug state comprises a pointer to a debug save area to store branch records for the trust domain and processor event-based sampling records for the trust domain.

12. The apparatus of claim 9, wherein the first single instruction further comprises a field to indicate the load of the control state of the trust domain from the data structure into the control register and the load the debug state of the trust domain from the data structure into the debug register are a first function of multiple selectable trust domain functions of the first single instruction.

13. The apparatus of claim 9, wherein the field is to indicate a register to store a linear address of the data structure.

14. The apparatus of claim 9, wherein:

the decoder circuitry of the hardware processor core is to decode a second single instruction into a second decoded instruction, the second single instruction having a field to indicate a data structure to store the control state of the trust domain and the debug state of the trust domain, and an opcode to indicate the execution circuitry is to save the control state of the trust domain into the data structure from the control register and clear the control register, and store the debug state of the trust domain into the data structure from the debug register and clear the debug register; and the execution circuitry of the hardware processor core to execute the second decoded instruction according to the opcode.

15. The apparatus of claim 9, wherein the clear of the debug register comprises a store of a zero bit value and a non-zero bit value into the control register.

16. The apparatus of claim 9, wherein:

the decoder circuitry of the hardware processor core is to decode a second single instruction into a second decoded instruction, the second single instruction having a field to indicate a register, and an opcode to indicate the execution circuitry is to store a value into the register to identify the control state and the debug state that the first single instruction is to save into the data structure; and the execution circuitry of the hardware processor core to execute the second decoded instruction according to the opcode.

17. A non-transitory machine-readable medium that stores code that when executed by a machine, wherein the machine comprises a control register, a debug register, and is to implement a trust domain manager to manage one or more hardware isolated virtual machines as a respective trust domain with a region of protected memory, and a virtual machine monitor that is not allowed access to the region of protected memory of the one or more hardware isolated virtual machines, causes the machine to perform a method comprising:

decoding, by decoder circuitry, a first single instruction into a first decoded instruction, the first single instruction having a field to indicate a data structure to store a control state of a trust domain and a debug state of the trust domain, and an opcode to indicate execution circuitry is to load the control state of the trust domain from the data structure into the control register and load the debug state of the trust domain from the data structure into the debug register; and executing, by the execution circuitry, the first decoded instruction according to the opcode.

18. The non-transitory machine-readable medium of claim 17, wherein the control state comprises a linear address that the trust domain attempted to access that caused a page fault.

19. The non-transitory machine-readable medium of claim 17, wherein the debug state comprises a pointer to a debug save area to store branch records for the trust domain and processor event-based sampling records for the trust domain.

20. The non-transitory machine-readable medium of claim 17, wherein the first single instruction further comprises a field to indicate the load of the control state of the trust domain from the data structure into the control register and the load the debug state of the trust domain from the data structure into the debug register are a first function of multiple selectable trust domain functions of the first single instruction.

21. The non-transitory machine-readable medium of claim 17, wherein the field is to indicate a register to store a linear address of the data structure.

22. The non-transitory machine-readable medium of claim 17, wherein the method further comprises:

decoding, by the decoder circuitry, a second single instruction into a second decoded instruction, the second single instruction having a field to indicate a data structure to store the control state of the trust domain and the debug state of the trust domain, and an opcode to indicate the execution circuitry is to save the control state of the trust domain into the data structure from the control register and clear the control register, and store the debug state of the trust domain into the data structure from the debug register and clear the debug register; and executing, by the execution circuitry, the second decoded instruction according to the opcode.

23. The non-transitory machine-readable medium of claim 17, wherein the clear of the debug register comprises a store of a zero bit value and a non-zero bit value into the control register.

24. The non-transitory machine-readable medium of claim 17, wherein the method further comprises:

decoding, by the decoder circuitry, a second single instruction into a second decoded instruction, the second single instruction having a field to indicate a register, and an opcode to indicate the execution circuitry is to store a value into the register to identify the control state and the debug state that the first single instruction is to save into the data structure; and executing, by the execution circuitry, the second decoded instruction according to the opcode.

* * * * *